(12) United States Patent
Kita et al.

(10) Patent No.: US 12,646,331 B2
(45) Date of Patent: Jun. 2, 2026

(54) ITEM DETECTION DEVICE AND METHOD, AND INDUSTRIAL VEHICLE, THAT DETECT THE POSTURE OF THE ITEM TO BE LOADED AND UNLOADED

(71) Applicants: KABUSHIKI KAISHA TOYOTA JIDOSHOKKI, Kariya (JP); NATIONAL INSTITUTE OF ADVANCED INDUSTRIAL SCIENCE AND TECHNOLOGY, Tokyo (JP); Tokyo University of Science Foundation, Tokyo (JP)

(72) Inventors: Yasuyo Kita, Tokyo (JP); Yudai Fujieda, Tokyo (JP); Ichiro Matsuda, Tokyo (JP); Nobuyuki Kita, Tsukuba (JP); Yukikazu Koide, Tsukuba (JP)

(73) Assignees: KABUSHIKI KAISHA TOYOTA JIDOSHOKKI, Kariya (JP); NATIONAL INSTITUTE OF ADVANCED INDUSTRIAL SCIENCE AND TECHNOLOGY, Tokyo (JP); Tokyo University of Science Foundation, Tokyo (JP)

( * ) Notice: Subject to any disclaimer, the term of this patent is extended or adjusted under 35 U.S.C. 154(b) by 309 days.

(21) Appl. No.: 18/434,392

(22) Filed: Feb. 6, 2024

(65) Prior Publication Data

US 2024/0273912 A1     Aug. 15, 2024

(30) Foreign Application Priority Data

Feb. 9, 2023     (JP) ................................. 2023-018218

(51) Int. Cl.
*G06V 20/56*          (2022.01)
*B66F 9/06*           (2006.01)
(Continued)

(52) U.S. Cl.
CPC ................ *G06V 20/56* (2022.01); *B66F 9/06* (2013.01); *B66F 9/0755* (2013.01); *G01B 11/02* (2013.01);
(Continued)

(58) Field of Classification Search
CPC ........ G06V 20/50; G06V 20/56; G06V 20/64; G01B 11/02; G01B 11/028; G01B 11/14;
(Continued)

(56) References Cited

U.S. PATENT DOCUMENTS 9,635,346 B2 *    4/2017   Iida ........................ G01S 17/894
11,958,687 B2 *   4/2024   Ji .......................... G05D 1/2435
(Continued)

FOREIGN PATENT DOCUMENTS

| JP | 5-157518 A | 6/1993 |
| JP | 7252581 B2 | 4/2023 |
| JP | 2023-124122 A | 9/2023 |

*Primary Examiner* — Scott A Rogers
(74) *Attorney, Agent, or Firm* — Sughrue Mion, PLLC

(57)     ABSTRACT

There is provided an item detection device that detects an item to be loaded and unloaded and includes an image acquisition unit acquiring a posture detection unit detecting the posture of the part to be loaded and unloaded on the basis of a computation result of the computing unit. The posture detection unit scans the second information image across a first region in which the feature part is present and a second region in which the feature part is not present to acquire a change in a visual parameter, calculates notation information indicating the boundary portion of the item on the basis of the change in the visual parameter, detects the feature line on the basis of the notation information, and detects the posture on the basis of a difference in angle between the feature line and a reference line in the second information image.

13 Claims, 23 Drawing Sheets

(51) Int. Cl.

| | |
|---|---|
| *B66F 9/075* | (2006.01) |
| *G01B 11/02* | (2006.01) |
| *G01B 11/14* | (2006.01) |
| *G01B 11/22* | (2006.01) |
| *G01B 11/24* | (2006.01) |
| *G01B 11/26* | (2006.01) |
| *G06T 7/00* | (2017.01) |
| *G06T 7/50* | (2017.01) |
| *G06T 7/507* | (2017.01) |
| *G06T 7/543* | (2017.01) |
| *G06T 7/73* | (2017.01) |
| *G06V 20/50* | (2022.01) |
| *G06V 20/64* | (2022.01) |

(52) U.S. Cl.
CPC ............ *G01B 11/028* (2013.01); *G01B 11/14* (2013.01); *G01B 11/22* (2013.01); *G01B 11/24* (2013.01); *G01B 11/2433* (2013.01); *G01B 11/26* (2013.01); *G06T 7/0004* (2013.01); *G06T 7/0008* (2013.01); *G06T 7/001* (2013.01); *G06T 7/50* (2017.01); *G06T 7/507* (2017.01); *G06T 7/543* (2017.01); *G06T 7/73* (2017.01); *G06V 20/50* (2022.01); *G06V 20/64* (2022.01); *G06T 2207/30108* (2013.01); *G06T 2207/30252* (2013.01)

(58) Field of Classification Search
CPC ..... G01B 11/22; G01B 11/24; G01B 11/2433; G01B 11/26; G06T 7/0004; G06T 7/0008; G06T 7/001; G06T 7/50; G06T 7/507; G06T 7/543; G06T 7/73; G06T 2207/30108; G06T 2207/30252; B66F 9/06; B66F 9/0755
See application file for complete search history.

(56) References Cited

U.S. PATENT DOCUMENTS

| | | | | |
|---|---|---|---|---|
| 12,159,428 | B2 * | 12/2024 | Kita | ..................... G06V 10/255 |
| 12,209,004 | B2 * | 1/2025 | Kawauchi | ............. B66F 9/0755 |
| 12,330,924 | B2 * | 6/2025 | Kim | ........................ G05D 1/617 |
| 12,493,974 | B2 * | 12/2025 | Kai | ........................... G06T 7/70 |
| 2021/0216073 | A1 * | 7/2021 | Araki | ................... G05D 1/0094 |
| 2022/0189055 | A1 | 6/2022 | Kita et al. | |
| 2023/0331527 | A1 * | 10/2023 | Chew | ..................... B66F 9/063 |
| 2024/0217792 | A1 * | 7/2024 | Kai | ....................... B66F 9/0755 |

* cited by examiner

*Fig.14*

ITEM DETECTION DEVICE AND METHOD, AND INDUSTRIAL VEHICLE, THAT DETECT THE POSTURE OF THE ITEM TO BE LOADED AND UNLOADED

CROSS REFERENCE TO RELATED APPLICATIONS

This application claims priority to Japanese Patent Application No. 2023-018218 filed on Feb. 9, 2023, the entire contents of which are incorporated by reference herein.

TECHNICAL FIELD

The present invention relates to an item detection device, an item detection method, and an industrial vehicle.

BACKGROUND

For example, a technique disclosed in Japanese Unexamined Patent Publication No. H5-157518 is known as an item detection device according to the related art. The item detection device disclosed in Japanese Unexamined Patent Publication No. H5-157518 is used to recognize a position where a pallet is present and a position where a fork is inserted in a case in which a forklift takes out the pallets stacked in multiple layers and transports the pallets. The item detection device detects the position of the pallet to be loaded and unloaded from a feature part of the item whose relative relationship with respect to the overall contour of the item is known to compute the position and posture of a front surface of the pallet.

SUMMARY

The technique disclosed in Japanese Unexamined Patent Publication No. H5-157518 is effective in a case in which the forklift approaches the pallet to be loaded and unloaded from a front direction and then detects the position of the pallet. However, in recent years, it has been required to observe the surroundings not only in the front direction but also from a position away from the pallet, to detect a target pallet, and to calculate the position and posture of the pallet. Before the vehicle body approaches the vicinity of the item to be loaded and unloaded, the item detection device understands the position and posture of the part to be loaded and unloaded in the item. Therefore, the vehicle body can approach the item on a track on which smooth loading and unloading are performed.

Here, in the detection of the position of the item to be loaded and unloaded, it is necessary to accurately detect the posture (yaw angle) of the item.

Therefore, an object of the invention is to provide an item detection device, an item detection method, and an industrial vehicle that can accurately detect the posture of an item to be loaded and unloaded.

According to an aspect of the invention, there is provided an item detection device that detects an item to be loaded and unloaded. The item detection device includes: an image acquisition unit acquiring a surrounding image obtained by capturing surroundings of the item detection device; an information image creation unit creating a first information image, in which information related to a part to be loaded and unloaded in the item has been converted into an easily recognizable state, on the basis of the surrounding image; a computing unit computing at least one of a position and a posture of the part to be loaded and unloaded on the basis of the first information image; and a posture detection unit detecting the posture of the part to be loaded and unloaded on the basis of a computation result of the computing unit. The information image creation unit creates a second information image obtained by projecting the information acquired at a position where the surrounding image has been acquired onto a horizontal plane including a feature line of the item. The posture detection unit disposes a boundary portion of a feature part estimated in advance in the item at any position of the second information image in the second information image, scans the second information image across a first region in which the feature part is present and a second region in which the feature part is not present to acquire a change in a visual parameter, calculates notation information indicating the boundary portion of the item on the basis of the change in the visual parameter, detects the feature line on the basis of the notation information, and detects the posture on the basis of a difference in angle between the feature line and a reference line in the second information image.

The item detection device includes the image acquisition unit acquiring the surrounding image obtained by capturing the surroundings of the item detection device and the information image creation unit creating the information image, in which the information related to the part to be loaded and unloaded in the item has been converted into the easily recognizable state, on the basis of the surrounding image. For example, in some cases, it is difficult to directly detect the item from the surrounding image showing the aspect of the surroundings of the item detection device, depending on the distance or positional relationship between the item detection device and the item. In contrast, the information image creation unit can create an information image suitable for detecting the part to be loaded and unloaded in the item, on the basis of the surrounding image obtained by capturing the surroundings of the item detection device. In addition, the item detection device includes the computing unit computing at least one of the position and the posture of the part to be loaded and unloaded on the basis of the information image. With this configuration, the computing unit can perform computation through the information image suitable for detecting the part to be loaded and unloaded in the item to compute at least one of the position and the posture of the part to be loaded and unloaded in a stage before the item detection device approaches the vicinity of the item. Here, the item detection device includes the posture detection unit detecting the posture of the part to be loaded and unloaded on the basis of the computation result of the computing unit. The information image creation unit creates the second information image obtained by projecting the information acquired at the position where the surrounding image has been acquired onto the horizontal plane including the feature line of the item. The second information image is an information image having the horizontal plane as the projection plane. Therefore, the feature line of the item in the second information image is a line that makes it easy to detect a yaw angle, which is an azimuth angle in the horizontal plane, in the posture of the item. The posture detection unit detects the feature line from the second information image and detects the posture on the basis of the difference in angle between the feature line and the reference line in the second information image. It is possible to correct the posture of the item based on the computation result of the computing unit on the basis of the difference in angle. Here, the posture detection unit disposes the boundary portion of the feature part estimated in advance in the item at any position of the second information image in the second information image. As described above, the boundary portion of the feature part which is a candidate for the feature line is disposed at any position where it is easy to detect the feature line. The posture detection unit scans the second information image across the first region in which the feature part is present and the second region in which the feature part is not present to acquire the change in the visual parameter. Therefore, it is possible to acquire information of the change in the visual parameter in the vicinity of the boundary portion of the feature part without omission. The posture detection unit calculates the notation information indicating the boundary portion of the item on the basis of the change in the visual parameter and detects the feature line on the basis of the notation information. Therefore, in the second information image, the notation information can be written in a portion in which the boundary portion of the item is likely to be present. As a result, it is possible to accurately detect the feature line. In this way, it is possible to accurately detect the posture of the item to be loaded and unloaded.

The visual parameter may be a gray value in a case in which the second information image is expressed in monochrome. In this case, since it is easy to acquire a change in the gray value in the monochrome image, it is possible to reduce a computational load.

The notation information may a point group, and the posture detection unit may apply RANSAC to the point group to detect the feature line. Since RANSAC is strong in response in a case in which outliers are present, it is possible to robustly detect the feature line.

The item may be a pallet, and the feature part may be an end portion of the pallet estimated from a presence candidate for the pallet detected in the first information image. Since the end portion of the pallet has a linear shape, the end portion is easily detected as the feature line.

The item may be a pallet, and the feature part may be an end portion of a shadow of a hole portion of the pallet estimated from a presence candidate for the pallet detected in the first information image. Since the hole portion of the pallet is shaded and is likely to be linear, the hole portion is easily detected as the feature line.

The posture detection unit may use an average value of an acquisition result of the visual parameter in a first local region selected from the first region and an acquisition result of the visual parameter in a second local region selected from the second region as a threshold value for determining the change in the visual parameter.

According to another aspect of the invention, there is provided an item detection method that detects an item to be loaded and unloaded. The item detection method includes: an image acquisition step of acquiring a surrounding image obtained by capturing surroundings; an information image creation step of creating a first information image, in which information related to a part to be loaded and unloaded in the item has been converted into an easily recognizable state, on the basis of the surrounding image; a computing step of computing at least one of a position and a posture of the part to be loaded and unloaded on the basis of the first information image; and a posture detection step of detecting the posture of the part to be loaded and unloaded on the basis of a computation result in the computing step. In the posture detection step, a second information image obtained by projecting information acquired at a position where the surrounding image has been acquired onto a horizontal plane including a feature line of the item is created, a boundary portion of a feature part estimated in advance in the item is disposed at any position of the second information image in the creation of the second information image, the second information image is scanned across a first region in which the feature part is present and a second region in which the feature part is not present to acquire a change in a visual parameter, notation information indicating the boundary portion of the item is calculated on the basis of the change in the visual parameter, the feature line is detected on the basis of the notation information, and the posture is detected on the basis of a difference in angle between the feature line and a reference line in the second information image.

According to the item detection method, it is possible to obtain the same operation and effect as those of the item detection device.

According to still another aspect of the invention, there is provided an industrial vehicle including the above-described item detection device.

According to the industrial vehicle, it is possible to obtain the same operation and effect as those of the item detection device.

According to the invention, it is possible to provide the item detection device, the item detection method, and the industrial vehicle that can detect the item to be loaded and unloaded regardless of the positional relationship with the item.

BRIEF DESCRIPTION OF THE DRAWINGS

FIG. 14 is a graph illustrating an example of a distribution of a degree of matching when a yaw angle θ and a depth distance D are changed.

DETAILED DESCRIPTION

Hereinafter, embodiments of the invention will be described in detail with reference to the drawings.

Figure 1:
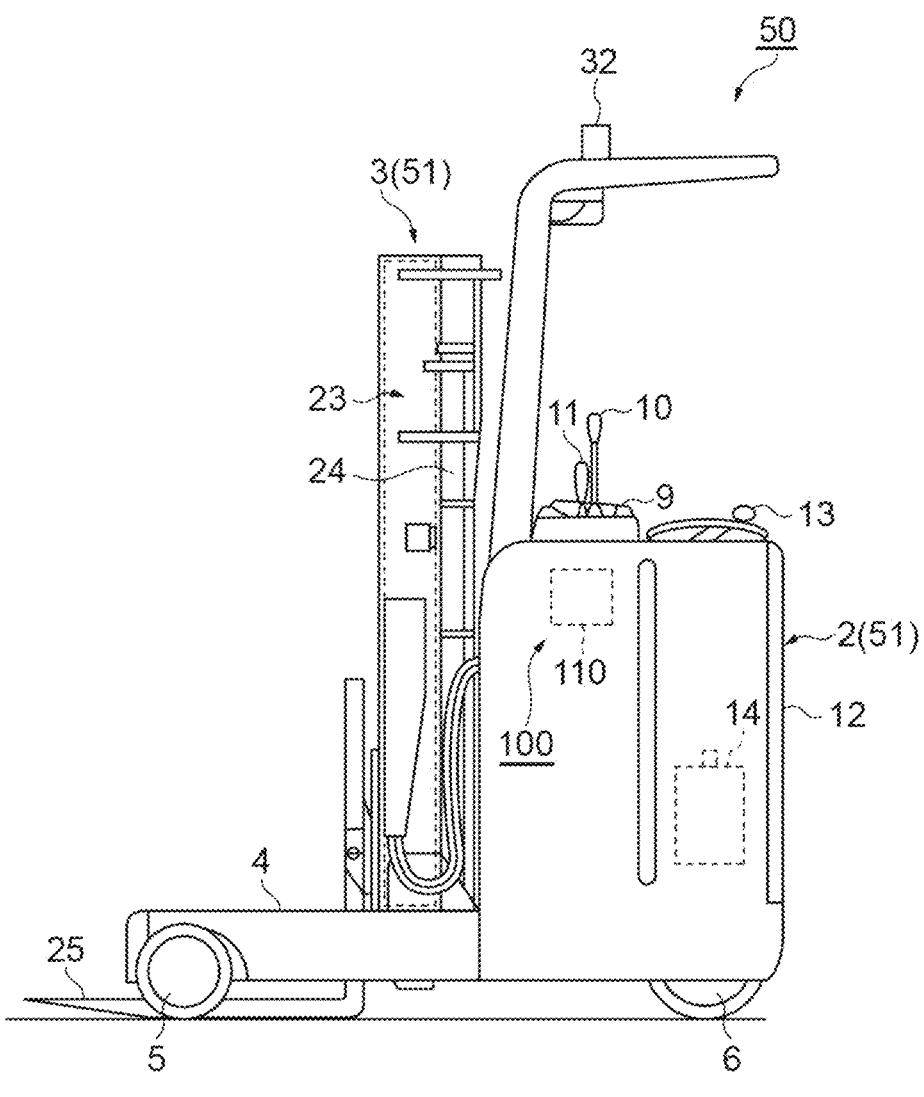
FIG. 1 is a side view illustrating a forklift including an item detection device according to an embodiment of the invention.

FIG. 1 is a side view illustrating an industrial vehicle including an item detection device according to an embodiment of the invention. In addition, description will be made below using "right" and "left". However, it is assumed that the "right" and the "left" correspond to "right" and "left", respectively, when the vehicle is viewed from the rear to the front. As illustrated in FIG. 1, in this embodiment, a forklift 50 is given as an example of the industrial vehicle that loads and unloads items. The forklift 50 includes a vehicle body 51, an imaging unit 32, and an item detection device 100. The forklift 50 includes a moving body 2 and a loading and unloading device 3. The forklift 50 according to this embodiment is a reach-type forklift and can switch between a manual operation by a driver sitting in a driver's seat 12 and an automatic operation by a control unit 110 which will be described below. Alternatively, the forklift 50 may be fully automated by the control unit 110.

The moving body 2 includes a pair of right and left reach legs 4 which extend forward. Right and left front wheels 5 are rotatably supported by the right and left reach legs 4, respectively. A rear wheel 6 is one rear wheel and is a drive wheel that also serves as a steering wheel. A rear portion of the moving body 2 is a standing-type driver's seat 12. An instrument panel 9 in front of the driver's seat 12 is provided with a loading and unloading lever 10 for loading and unloading operations and an accelerator lever 11 for forward and backward operations. In addition, a steering wheel 13 is provided on an upper surface of the instrument panel 9.

The loading and unloading device 3 is provided on the front side of the moving body 2. When a reach lever of the loading and unloading lever 10 is operated, a reach cylinder (not illustrated) is expanded and contracted to move the loading and unloading device 3 in a front-rear direction along the reach leg 4 within a predetermined stroke range. Further, the loading and unloading device 3 includes a two-stage mast 23, a lift cylinder 24, a tilt cylinder (not illustrated), and a fork 25. When a lift lever of the loading and unloading lever 10 is operated, the lift cylinder 24 is expanded and contracted to slide the mast 23 such that the mast 23 is expanded and contracted in the vertical direction. Then, the fork 25 is moved up and down in operative association with the sliding.

Figure 2:
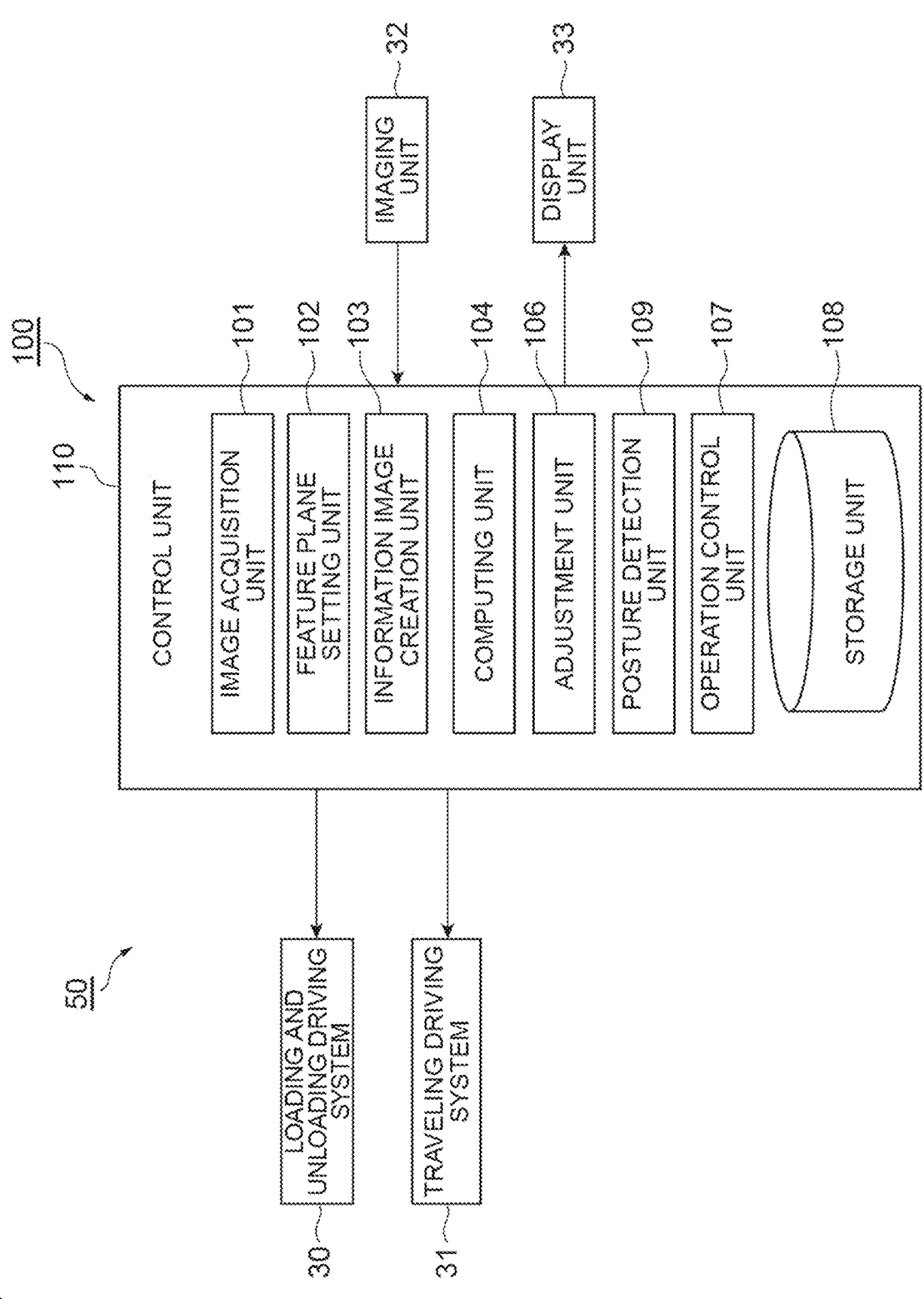
FIG. 2 is a block diagram illustrating the item detection device illustrated in FIG. 1 and components related to the item detection device.

Next, the item detection device 100 of the forklift 50 according to this embodiment will be described in more detail with reference to FIG. 2. FIG. 2 is a block diagram illustrating the item detection device 100 according to this embodiment and components related thereto. As illustrated in FIG. 2, the item detection device 100 includes the control unit 110. The control unit 110 of the item detection device 100 is connected to a loading and unloading driving system 30 and a traveling driving system 31 and transmits control signals to these systems. The loading and unloading driving system 30 is a driving system that generates a driving force for operating the loading and unloading device 3. The traveling driving system 31 is a driving system that generates a driving force for making the moving body 2 travel.

The control unit 110 is connected to the imaging unit 32 and acquires an image captured by the imaging unit 32. The imaging unit 32 captures an image of the surroundings of the vehicle body 51 of the forklift 50. In the example illustrated in FIG. 1, the imaging unit 32 is provided in a ceiling portion of the vehicle body 51, but may be provided at any position as long as it can capture the image of the surroundings of the vehicle body 51. The specific configuration of the imaging unit 32 will be described below. The control unit 110 is connected to a display unit 33 and outputs various kinds of image data to the display unit 33. In addition, in the case of the forklift 50 that can be fully automated by the control unit 110, the display unit 33, the loading and unloading lever 10, the accelerator lever 11, and the steering wheel 13 may not be provided.

The item detection device 100 is a device that detects the item to be loaded and unloaded. In addition, the control unit 110 of the item detection device 100 performs control to automatically operate the forklift 50. The control unit 110 detects the item in a stage before the forklift 50 approaches the item to be loaded and unloaded and understands the position and posture of a part to be loaded and unloaded in the item. Then, the control unit 110 performs control such that the forklift 50 can approach the item so as to smoothly load the item and can insert the fork 25 into the part to be loaded and unloaded.

Figure 3:
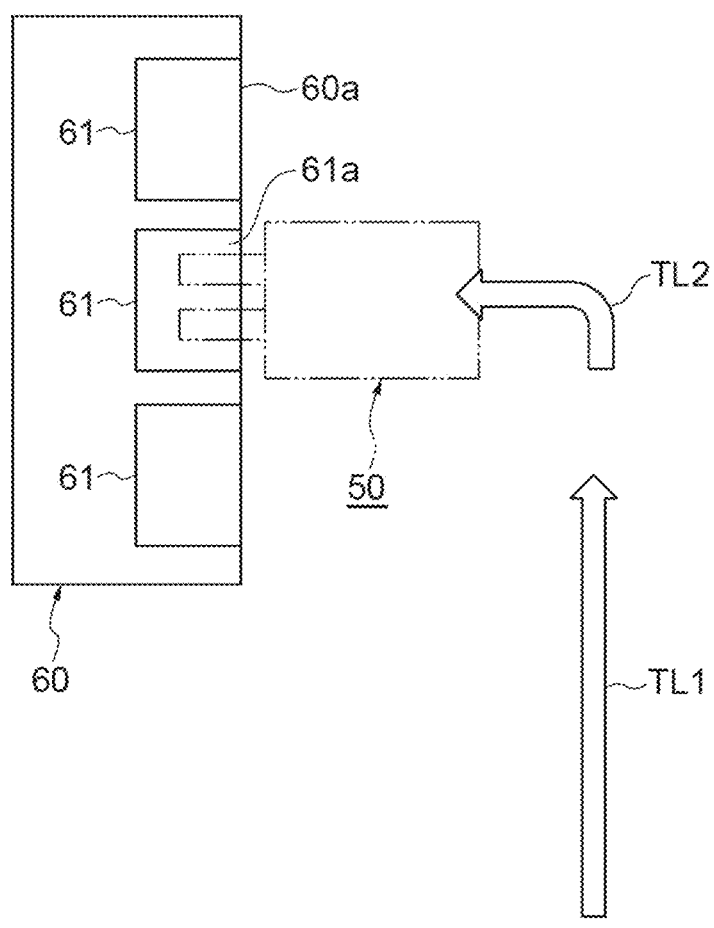
FIG. 3 is a schematic plan view illustrating an operation until the forklift loads a pallet.
Figure 3:
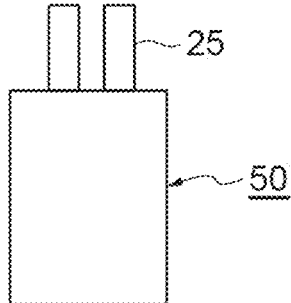

FIG. 3 is a schematic plan view illustrating an operation until the forklift 50 loads a pallet 61. As illustrated in FIG. 3, a case in which the forklift 50 loads the pallet 61 (the item to be loaded and unloaded) disposed on a shelf 60 will be described. The control unit 110 controls the traveling of the forklift 50 such that the forklift 50 approaches the shelf 60. In this case, the control unit 110 performs control such that the forklift 50 approaches the shelf 60 from the side of the shelf 60 (see a track TL1). The control unit 110 performs control such that the forklift 50 turns in front of the shelf 60 (see a track TL2). In this case, the forklift 50 is in a posture facing a front surface 60*a* of the shelf 60 and a front surface 61*a* (the part to be loaded and unloaded) of the pallet 61. Then, the control unit 110 performs control such that the forklift 50 linearly approaches the front surface 61*a* of the pallet 61 on the shelf 60 and inserts the fork 25 into a hole portion formed in the front surface 61*a* of the pallet 61. When performing this control, the control unit 110 detects the pallet 61 in a stage before turning, that is, a stage in which the forklift 50 travels on the track TL1 and acquires the position and posture of the front surface 61*a* of the pallet 61. In a case in which a plurality of pallets 61 are disposed on the shelf 60, the control unit 110 checks in advance which pallet 61 to take out in this loading and unloading operation and detects a target pallet 61 from the shelf 60. In addition, the control unit 110 detects the position and posture of the detected pallet 61. The control unit 110 controls the turning position or turning track of the forklift 50 on the basis of the detection result such that the forklift 50 can smoothly insert the fork 25 into the hole portion of the front surface 61*a* of the pallet 61.

The control unit 110 includes an electronic control unit [ECU] that manages the overall operation of the device. The ECU is an electronic control unit having, for example, a central processing unit [CPU], a read only memory [ROM], a random access memory [RAM], and a controller area network [CAN] communication circuit. In the ECU, for example, a program stored in the ROM is loaded into the RAM, and the CPU executes the program loaded in the RAM to implement various functions. The ECU may be composed of a plurality of electronic units. As illustrated in FIG. 2, the control unit 110 includes an image acquisition unit 101, a feature plane setting unit 102, an information image creation unit 103, a computing unit 104, an adjustment unit 106, an operation control unit 107, a storage unit 108, and a posture detection unit 109.

Figure 4:
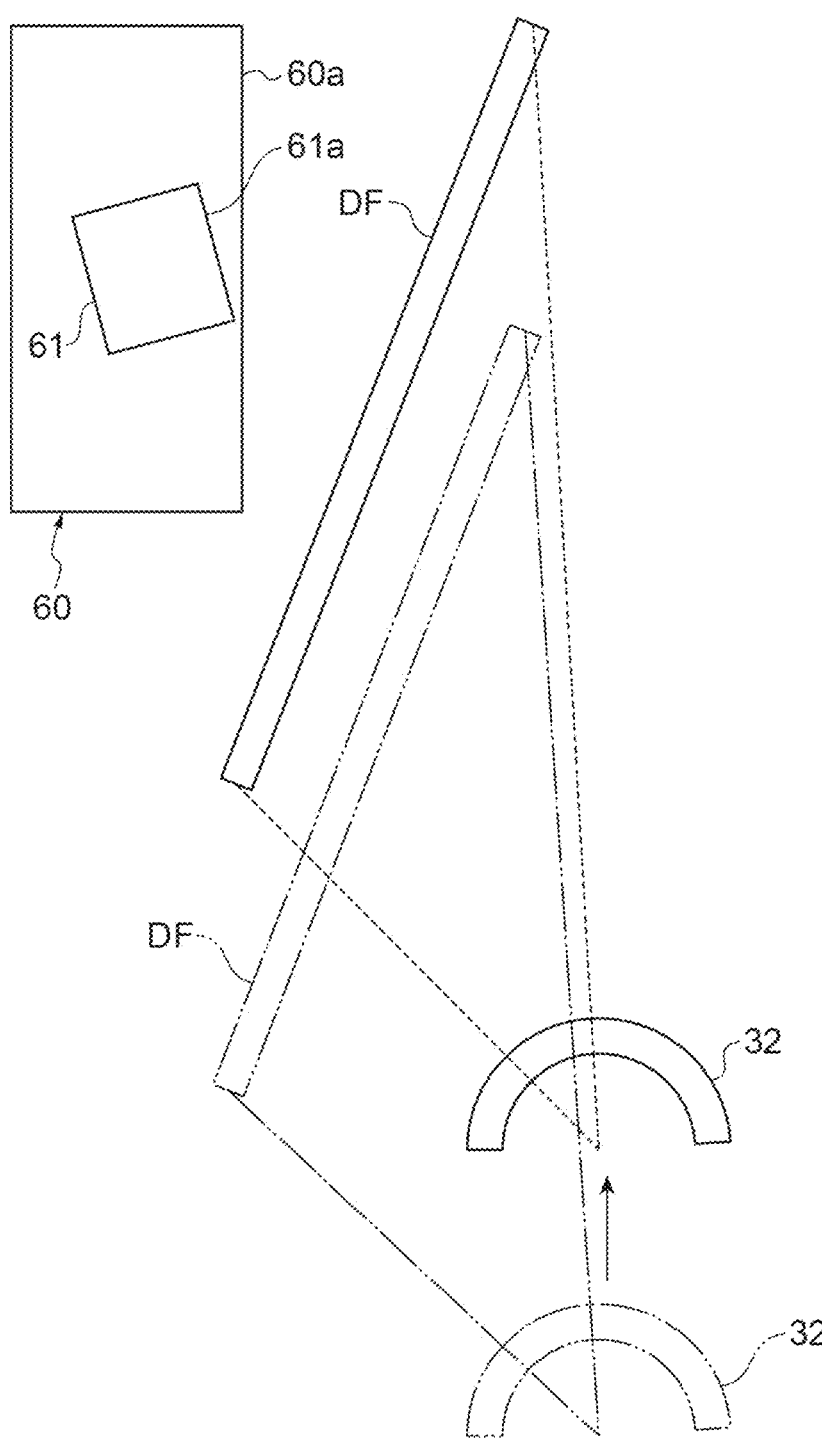
FIG. 4 is a schematic plan view illustrating a time-series positional relationship among an imaging unit, a shelf, and the pallet.

The image acquisition unit 101 acquires a surrounding image obtained by capturing the surroundings of the vehicle body 51 of the forklift 50. The image acquisition unit 101 acquires the surrounding images captured by the imaging unit 32 in time series. The imaging unit 32 performs imaging at predetermined time intervals to capture a plurality of images with the lapse of time. Therefore, a sequence of surrounding images acquired by the image acquisition unit 101 can be treated as a set of images showing the aspect of the surroundings at each time in time series with the lapse of time. The forklift 50 approaches the shelf 60 with the lapse of time. Therefore, as illustrated in FIG. 4, the imaging unit 32 gradually approaches the shelf 60 with the lapse of time. In the surrounding image acquired by the image acquisition unit 101, the shelf 60 and the pallet 61 in the image gradually become larger as the forklift 50 moves forward. In addition, FIG. 4 is a schematic plan view illustrating the time-series positional relationship among the imaging unit 32, the shelf 60, and the pallet 61. In FIG. 4, an inclination angle with respect to the front surface 61*a* of the pallet 61 and the front surface 60*a* of the shelf 60 is illustrated so as to be deformed in order to facilitate the understanding of the control content of the control unit 110. The aspect in which the inclination angle is deformed is illustrated in the following drawings.

Figure 5:
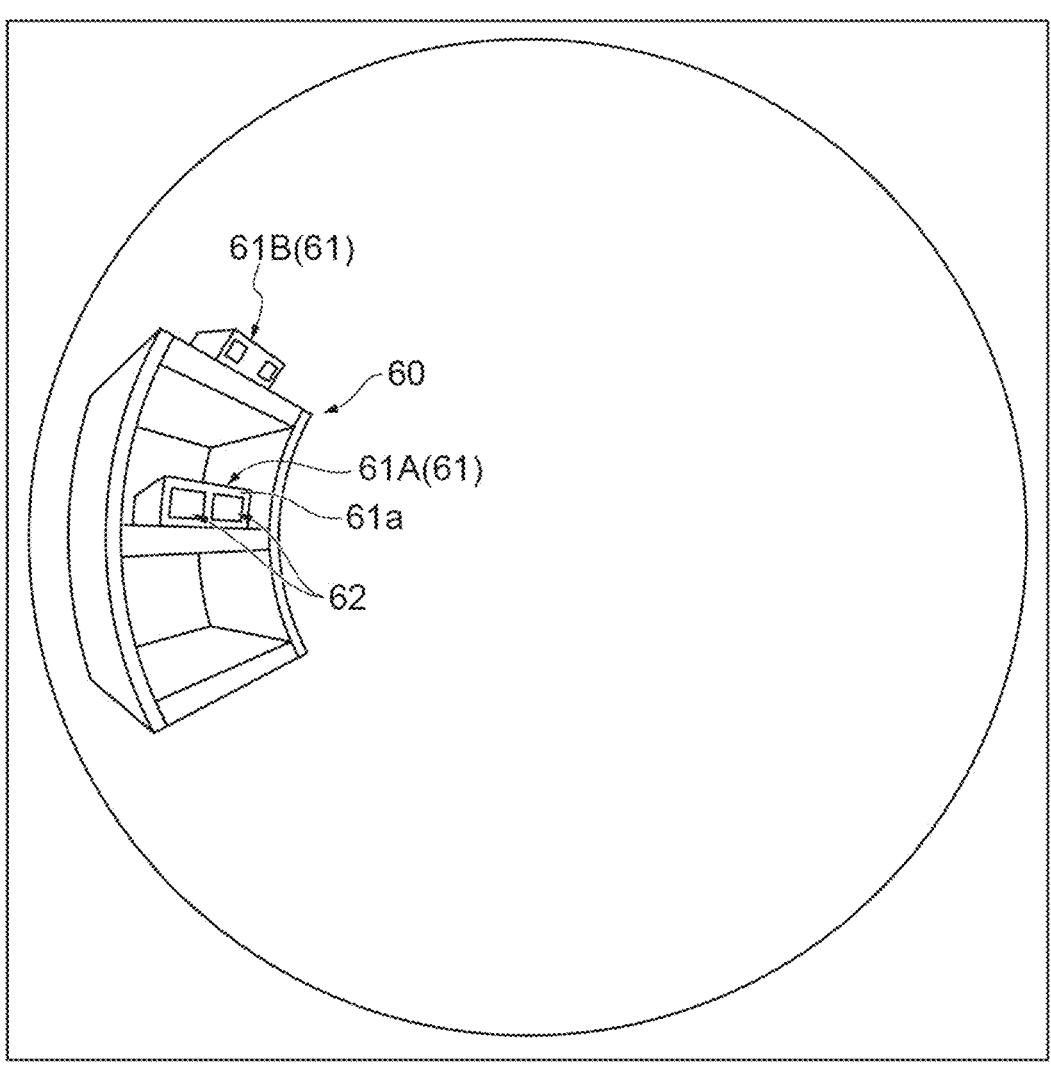
FIG. 5 is a diagram illustrating an example of a surrounding image.

The surrounding image is an image acquired by a fisheye camera. That is, the imaging unit 32 is composed of a fisheye camera. The fisheye camera is a camera that has a general fisheye lens and can capture an image in a wide field of view of about 180° with a monocular lens. FIG. 5 is a diagram illustrating an example of the surrounding image. Since the surrounding image is captured in a wide field of view, as illustrated in FIG. 5, a portion closer to the edge has a larger curvature. Further, in FIG. 5, surrounding structures other than the shelf 60 on which the pallet 61 is disposed are omitted. In addition, only a pallet 61A is disposed in a middle stage of the shelf 60, and only a pallet 61B is arranged in an upper stage of the shelf 60. However, a large number of pallets 61 may be disposed on the shelf 60. In addition, cargoes on the pallets 61A and 61B are omitted. When the forklift 50 is traveling on the track TL1 (see FIG. 3), the shelf 60 is disposed diagonally forward with respect to the imaging unit 32. Further, the front surface 60*a* of the shelf 60 and the front surface 61*a* of the pallet 61 are disposed so as to spread substantially in parallel to the traveling direction of the imaging unit 32. In the surrounding image, the shelf 60 and the pallet 61 are displayed in a state in which they are curved toward the edge.

In addition, the lens of the camera constituting the imaging unit 32 is not limited to the fisheye lens. The imaging unit 32 may have any lens as long as it has an angle of view sufficient to acquire the image of the pallet 61 at both the position where the forklift 50 is away from the shelf 60 and the position where the forklift 50 is close to the shelf 60. That is, the imaging unit 32 may be a wide-field camera that can simultaneously capture the front and side aspects of the forklift 50. In addition, the imaging unit 32 may capture an image in a wide field of view, and a wide-angle camera may be adopted. Further, for the imaging unit 32, a plurality of cameras pointed in a plurality of directions may be combined to capture a wide-field image.

The feature plane setting unit 102 sets a feature plane SF (see FIGS. 7A and 7B and FIG. 9) onto which the features of the front surface 61*a* of the pallet 61 are projected. The feature plane SF will be described in detail below.

The information image creation unit 103 creates an information image (first information image) in which information related to the front surface 61*a* of the pallet 61 has been converted into an easily recognizable state on the basis of the surrounding image. The information image creation unit 103 creates the information image using the feature plane SF. As described above, the surrounding image that can be directly acquired from the imaging unit 32 is an image in which the shelf 60 and the pallet 61 are shown so as to be curved as illustrated in FIG. 5. Further, in the surrounding image, the sizes of the shelf 60 and the pallet 61 vary depending on the distance from the imaging unit 32. Therefore, it is difficult to directly detect the pallet 61 to be loaded and unloaded from the surrounding image. For this reason, the information image creation unit 103 creates the information image in which information, such as the shape features and dimensional features of the front surface 61*a* of the pallet 61 to be loaded and unloaded, is clearly shown such that the front surface 61*a* of the pallet 61 is easily detected. A state in which the information related to the front surface 61*a* of the pallet 61 is easily recognized as described above means a state in which a computation load when the information is acquired from the information image by an image recognition process can be less than at least a computation load when the information is acquired from the surrounding image by image recognition process. In addition, in a case in which the computation load is the same, when the information is acquired from the information image, the information can be acquired more accurately than when the information is acquired from the surrounding image.

Figures 7A, 7B:
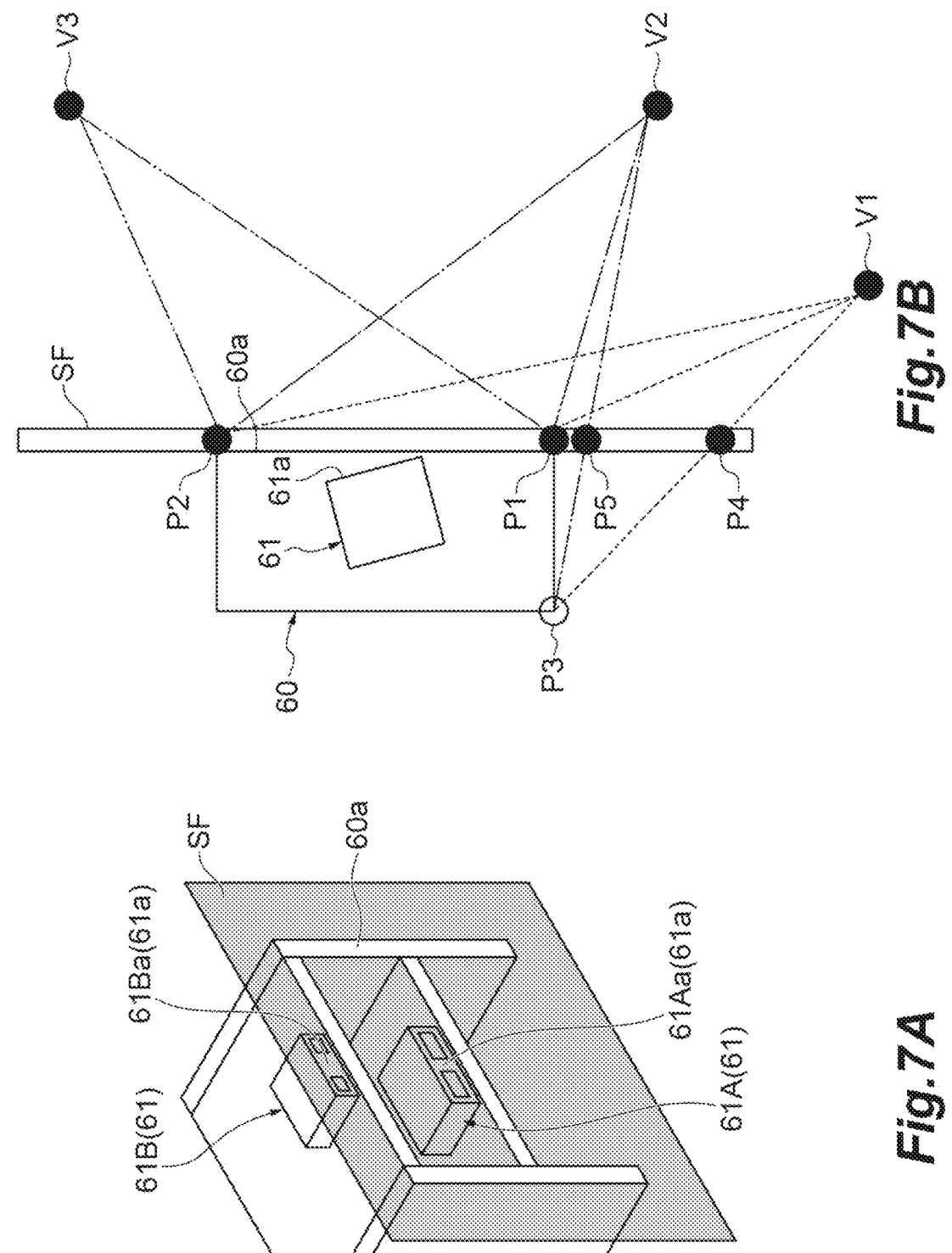
FIG. 7A is a perspective view illustrating an aspect in which a feature plane is set for a shelf.
FIG. 7B is a schematic plan view illustrating a positional relationship between the feature plane and a plurality of viewpoints V1, V2, and V3.

Here, the information image can most accurately show the shape features and dimensional features of the front surface 61*a* when the feature plane SF is set for the front surface 61*a* of the pallet 61 to be loaded and unloaded (the principle will be described below). However, in a stage in which the pallet 61 to be loaded and unloaded is not specified, it is difficult to set the feature plane SF for the front surface 61*a* of the pallet 61. Therefore, the feature plane setting unit 102 sets the feature plane SF for a part of a surrounding structure that can approximate the front surface 61*a* of the pallet 61. Here, the feature plane SF is set for the front surface 60*a* of the shelf 60 on the basis of the fact that the front surface 61*a* of each pallet 61 is disposed so as to be substantially matched with the front surface 60*a* of the shelf and to be substantially parallel to the front surface 60*a* at a close position, as illustrated in FIG. 7A.

Figure 8:
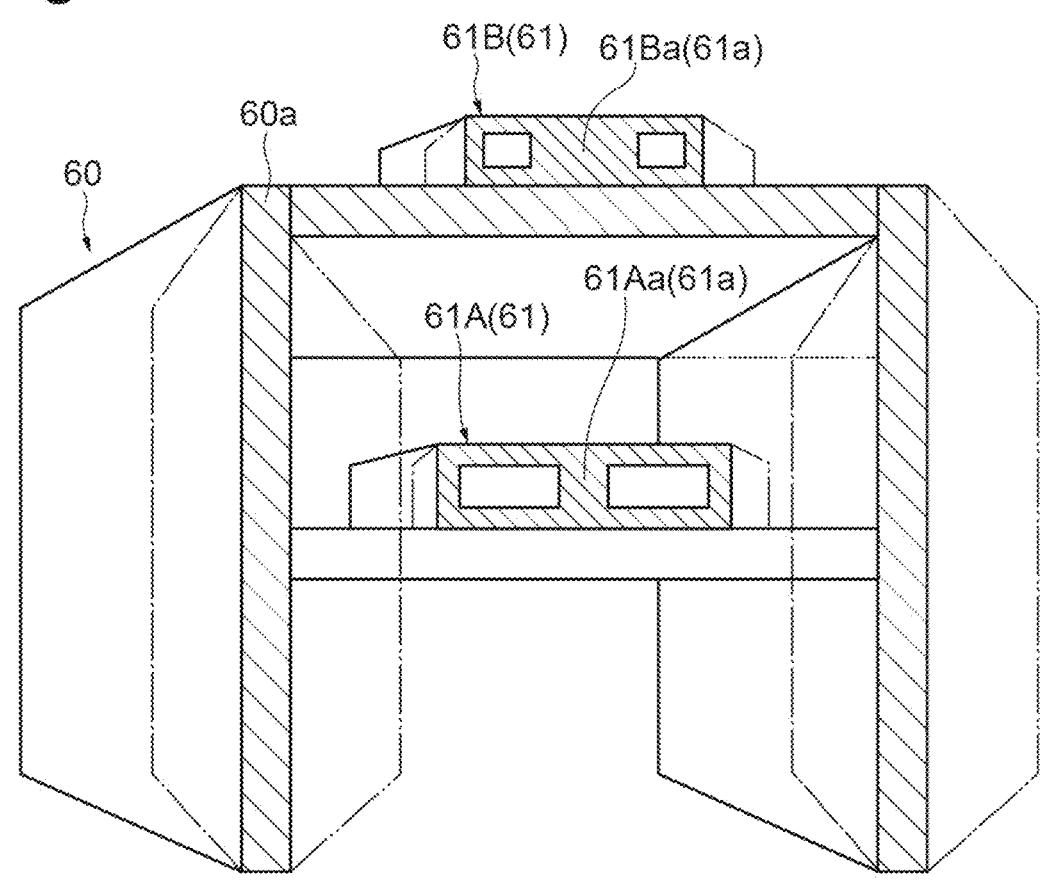
FIG. 8 illustrates an information image created using the feature plane.

The feature plane SF and the information image will be described in detail with reference to FIGS. 7A and 7B and FIG. 8. FIG. 7A is a perspective view illustrating an aspect in which the feature plane SF is set for the shelf 60. FIG. 7B is a schematic plan view illustrating the positional relationship between the feature plane SF and the plurality of viewpoints V1, V2, and V3. FIG. 8 illustrates the information image created using the feature plane SF.

The feature plane SF is a planar projection plane that is virtually set in a three-dimensional space in order to create the information image. In addition, the position and posture related to the feature plane SF are information that is known in the stage of setting. The information image is an image in which information acquired at the position where the surrounding image is acquired has been converted into an easily recognizable state. The information acquired at the position where the surrounding image is acquired includes information such as the position and size of each part of the shelf 60 and the pallet 61 when viewed from the position. The information image creation unit 103 projects the surrounding image onto the feature plane SF to create the information image. Since the image acquisition unit 101 acquires a plurality of surrounding images in time series, the information image creation unit 103 can also create a plurality of information images whose number is equal to the number of surrounding images.

The feature plane SF is a projection plane onto which the features of the front surface 61*a* of the pallet 61 are projected. Therefore, the feature plane SF is set such that the features of the front surface 61*a* of the pallet 61 are shown in the information image projected onto the feature plane SF. That is, the feature plane SF is a projection plane that is set at a position where the features of the front surface 61*a* of the pallet 61 can be accurately shown. In the information image of the front surface 61*a* of the pallet 61 projected onto the feature plane SF set in this way, information indicating the features of the front surface 61*a* is shown in an aspect in which it can be easily recognized by the image recognition process. The features of the front surface 61*a* mean the unique appearance features of the front surface 61*a* that can be distinguished from other items in the image. The information indicating the features of the front surface 61*a* is, for example, shape information or dimensional information that can specify the front surface 61*a*.

For example, the front surface 61*a* of the pallet 61 has a rectangular shape that extends in a width direction and is characterized by having two hole portions 62. Since the front surface 61*a* and the hole portions 62 of the pallet 61 are displayed so as to be distorted in the surrounding image (see FIG. 5), it is difficult to specify the shapes of the front surface 61*a* and the hole portions 62, to check the dimensions thereof, and to detect the front surface 61*a* and the hole portions 62 as features using the image recognition process. In contrast, in the image projected onto the feature plane SF, the shapes of the front surface 61*a* and the hole portions 62 of the pallet 61 are accurately shown without being deformed (see FIG. 11A). In addition, in the image projected onto the feature plane SF, dimensions L1, L2, and L3 for specifying the front surface 61*a* of the pallet 61 are shown in an aspect in which they can be measured (a specific method for specifying the dimensions will be described below). In the image projected onto the feature plane SF, the features of the front surface 61*a* of the pallet 61 are accurately shown. That is, in the image projected onto the feature plane SF, the information indicating the features of the front surface 61*a* is displayed in a form in which the information is converted so as to be easily recognizable by the image recognition process. As described above, the feature plane setting unit 102 sets the feature plane SF at a position where the information indicating the features of the front surface 61*a* of the pallet 61 can be easily recognized.

Here, the information image can most accurately show the shape features and dimensional features of the front surface 61*a* when the feature plane SF is set for the front surface 61*a* of the pallet 61 to be loaded and unloaded. However, in a stage in which the pallet 61 to be loaded and unloaded is not specified (when the state of the item is unknown), it is difficult to set the feature plane SF for the front surface 61*a* of the pallet 61. Therefore, the feature plane setting unit 102 sets the feature plane SF for a part of a structure around the pallet 61. As illustrated in FIG. 7A, the feature plane setting unit 102 sets the feature plane SF for the front surface 60*a* of the shelf 60. The front surface 61*a* of each pallet 61 is disposed so as to be substantially matched with the feature plane SF set for the front surface 60*a* and to be substantially parallel to the front surface 60*a* at a close position. Therefore, the information image projected onto the feature plane SF set for the front surface 60*a* of the shelf 60 is an image that sufficiently shows the features of the front surface 61*a* of each pallet 61.

As illustrated in FIG. 7B, an object that is present on the feature plane SF is projected at a position where the object is actually present in the image projected from any viewpoint. Specifically, one end portion P1 and the other end portion P2 of the front surface 60*a* of the shelf 60 are present on the feature plane SF. Therefore, the positions of the end portions P1 and P2 in the information image are constant regardless of which of the viewpoints V1, V2, and V3 the end portions are projected from. In contrast, an end portion P3 of a rear surface of the shelf 60 is projected at the position of a projection point P4 on the feature plane SF when it is projected from the viewpoint V1. Then, the end portion P3 is projected at the position of a projection point P5 different from the projection point P4 on the feature plane SF when it is projected from the viewpoint V2. As seen from the above, the position of an object, which is not present on the feature plane SF in the three-dimensional space, in the information image changes depending on the viewpoint. On the other hand, the actual shape features and dimensional features of an object, which is present on the feature plane SF in the three-dimensional space, are maintained in the information image regardless of the viewpoint. In addition, in practice, the imaging unit 32 does not move up to the position of the viewpoint V3 passing the shelf 60. However, the viewpoint V3 is illustrated for the sake of explanation.

In FIG. 8, a hatched portion is a portion that is present on the feature plane SF or at a position close to the feature plane SF. The position of the portion in the information image is substantially constant even when the viewpoint changes. Here, the sizes and positions of the front surface 60*a* of the shelf 60 and front surfaces 61Aa and 61Ba of the pallets 61A and 61B in the information image are constant regardless of the viewpoint. Here, the information image creation unit 103 associates dimensions corresponding to one pixel with the information image. That is, it is uniquely determined how large the size of one pixel in the information image is as the actual dimensions. Therefore, the sizes of the front surface 60a of the shelf 60 and the front surfaces 61Aa and 61Ba of the pallets 61A and 61B are constant in the information image regardless of which of the viewpoints the information image is projected from. On the other hand, the position of a portion, which is not present on the feature plane SF in the three-dimensional space, in the information image varies as the viewpoint changes. For example, among portions other than the hatched portion in FIG. 8, a portion represented by a solid line shows an aspect when viewed from the viewpoint V1, a portion represented by a one-dot chain line shows an aspect when viewed from the viewpoint V2, and a portion represented by a two-dot chain line shows an aspect when viewed from the viewpoint V3.

Figure 6B:
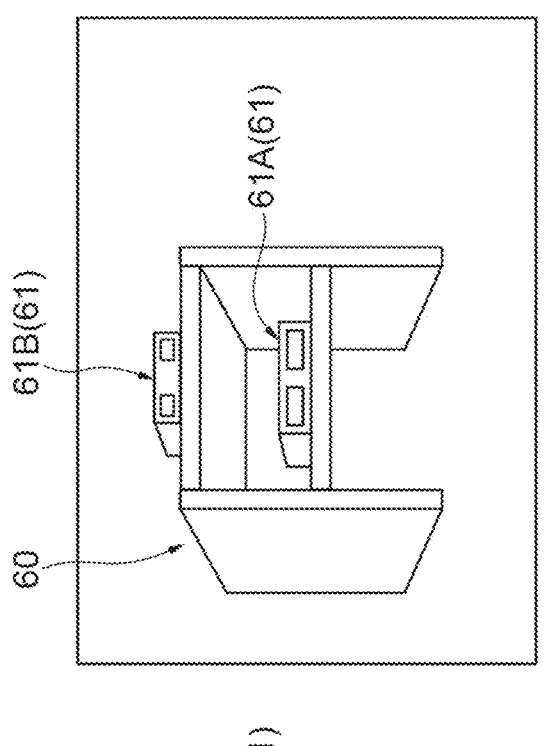
FIG. 6B illustrates a projection image acquired at the position of the imaging unit represented by a solid line in FIG. 4.
Figure 6A:
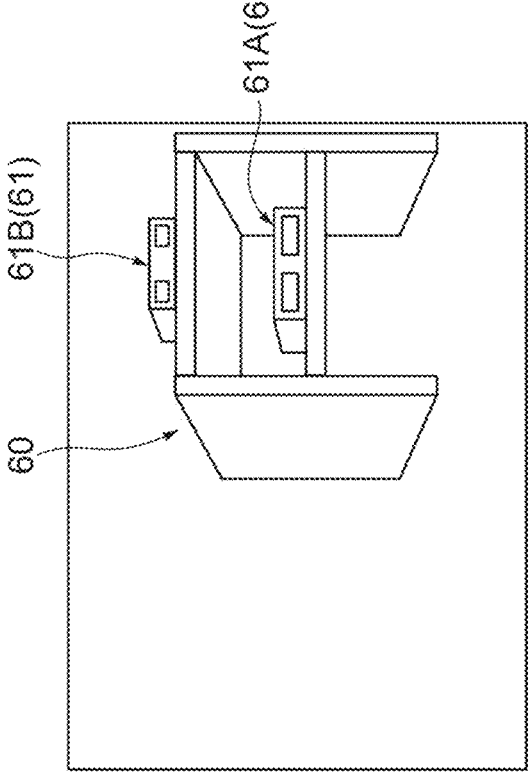
FIG. 6A illustrates a projection image acquired at the position of the imaging unit represented by a two-dot chain line in FIG. 4.

Next, how the feature plane setting unit 102 sets the feature plane SF for the front surface of the shelf 60 will be described with reference to FIG. 4 and FIGS. 6A and 6B. As illustrated in FIG. 4, the feature plane setting unit 102 uses a moving plane DF that moves in synchronization with the movement of the place where the surrounding image is captured as the projection plane. The movement of the place where the surrounding image is captured is the movement of the imaging unit 32 associated with the movement of the forklift 50. The moving plane DF is disposed a predetermined distance in front of the imaging unit 32 and is set in a direction in which it faces the front surface 60a of the shelf 60. In addition, the moving plane DF is set so as to be inclined with respect to the front surface 60a of the shelf 60 in order to be clearly distinguished from the feature plane SF on the drawings. However, the moving plane DF may not be inclined. The feature plane setting unit 102 acquires a projection image when the shelf 60 and the pallet 61 are projected onto the moving plane DF as viewed from the imaging unit 32. Since the imaging unit 32 is moved with the lapse of time, the feature plane setting unit 102 can acquire a plurality of projection images projected onto the moving plane DF in time series. Therefore, each of the surrounding images captured continuously in time series is acquired corresponding to the position at the time when each surrounding image is captured. FIG. 6A illustrates a projection image acquired at the position of the imaging unit 32 represented by a two-dot chain line in FIG. 4. FIG. 6B illustrates a projection image acquired at the position of the imaging unit 32 represented by a solid line in FIG. 4. As illustrated in FIGS. 6A and 6B, the shelf 60 and the pallets 61A and 61B in the projection image move in the projection image with the movement of the imaging unit 32. The plurality of projection images can be used to acquire information related to a three-dimensional shape, as in a known method for restoring a three-dimensional shape from a plurality of images captured at different positions. In addition, the plurality of images used to restore the three-dimensional shape may be captured at different positions and are not limited to a plurality of surrounding images captured in time series. For example, in a case in which a plurality of cameras are used, the three-dimensional shape may be restored on the basis of the geometric relationship between the positions of the cameras in two or more images captured at the same time.

The feature plane setting unit 102 generates a three-dimensional restored shape of the pallet 61 and the shelf 60 on the basis of the plurality of projection images. The feature plane setting unit 102 generates the three-dimensional restored shape from the plurality of projection images obtained using the time-series surrounding images and the moving plane DF. The feature plane setting unit 102 restores the three-dimensional shape of the shelf 60 and the pallet 61 with a known method using structure from motion [SFM]. Further, the feature plane setting unit 102 sets the feature plane SF on the basis of the restored shape. The feature plane setting unit 102 calculates an equation of the three-dimensional plane of the front surface 60a of the shelf 60 in the restored shape with a known plane detection method using random sampling consensus [RANSAC] and sets the equation for the feature plane SF.

Figure 9:
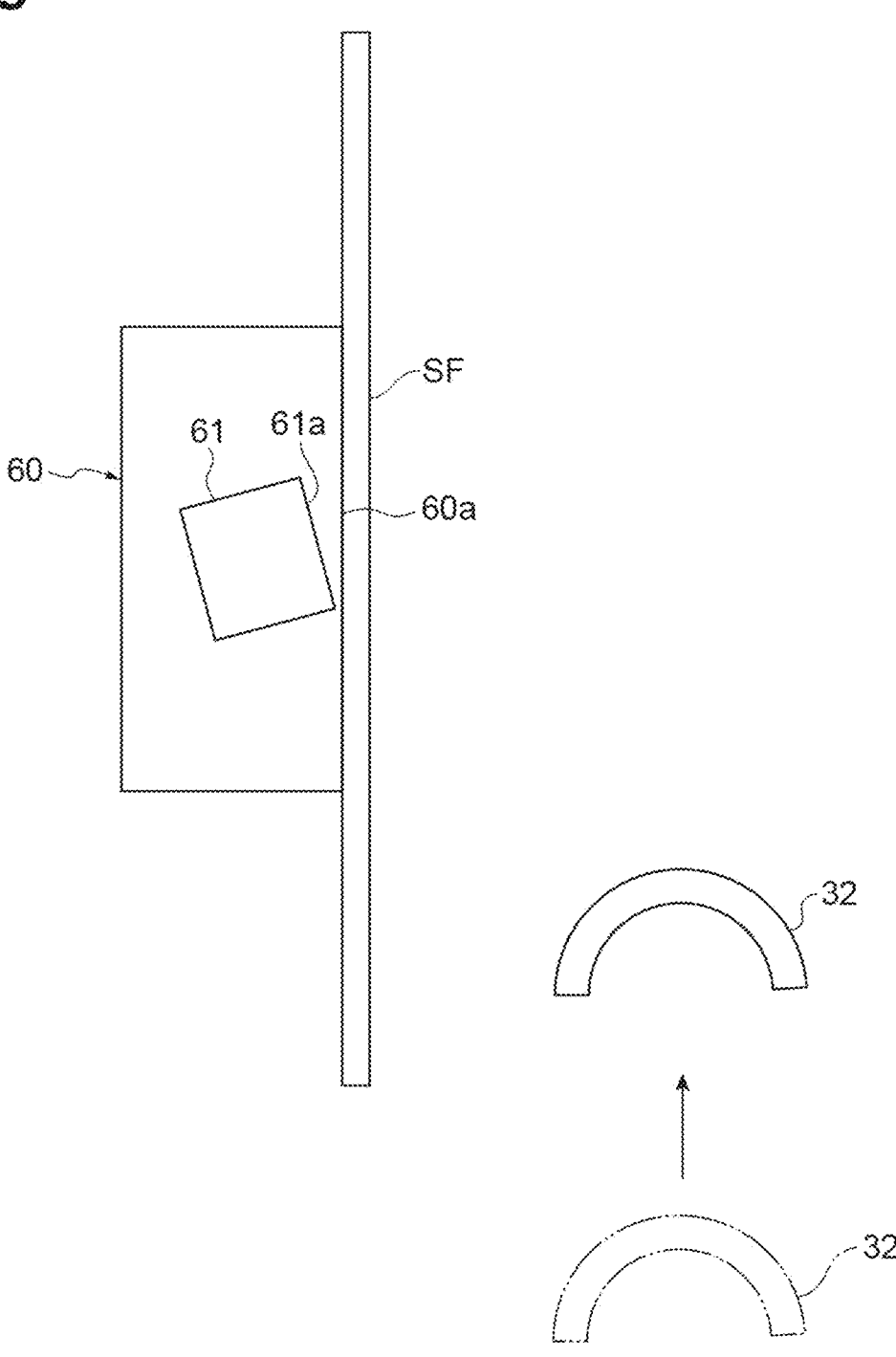
FIG. 9 is a schematic plan view illustrating the time-series positional relationship among the imaging unit, the shelf, and the pallet.
Figure 10B:
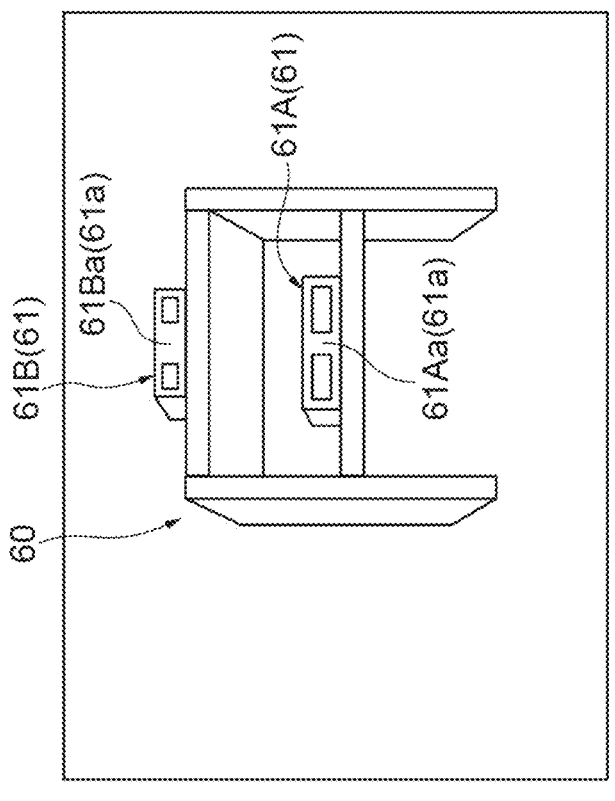
FIG. 10B illustrates an information image obtained when the imaging unit is present at the position represented by a solid line in FIG. 9.
Figure 10A:
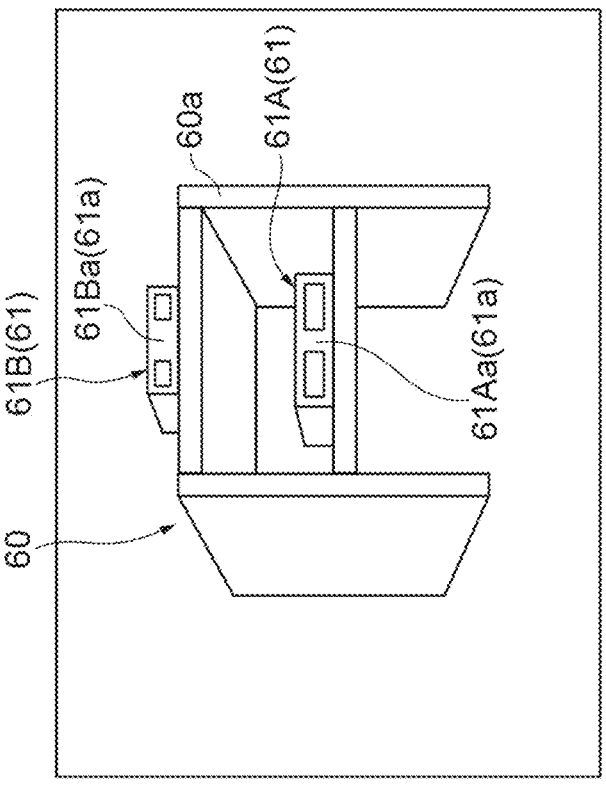
FIG. 10A illustrates an information image obtained when the imaging unit is present at the position represented by a two-dot chain line in FIG. 9.

After the feature plane setting unit 102 sets the feature plane SF as described above, the information image creation unit 103 projects the information obtained at the position where the surrounding image is acquired onto the feature plane SF to create an information image. FIG. 9 is a schematic plan view illustrating the time-series positional relationship among the imaging unit 32, the shelf 60, and the pallet 61. As illustrated in FIG. 9, the feature plane SF is always set at the position of the front surface 60a of the shelf 60 regardless of the position of the imaging unit 32. Therefore, the information image creation unit 103 can create an information image illustrated in FIGS. 10A and 10B. FIG. 10A illustrates an information image obtained when the imaging unit 32 is present at the position represented by a two-dot chain line in FIG. 9. FIG. 10B illustrates an information image obtained when the imaging unit 32 is present at the position represented by a solid line in FIG. 9. In the information image illustrated in FIG. 10A and the information image illustrated in FIG. 10B, the front surface 60a of the shelf 60 on the feature plane SF and the front surfaces 61Aa and 61Ba of the pallets 61A and 61B in the vicinity of the feature plane SF are shown at almost the same position with almost the same size.

The computing unit 104 detects the pallet 61 to be loaded and unloaded on the basis of the information image. Further, the computing unit 104 computes the position and posture of the front surface 61a of the pallet 61 to be loaded and unloaded on the basis of the information image. Here, the "position" and "posture" of the front surface 61a include the meaning of both the relative three-dimensional position and posture (the position and posture in a camera coordinate system) of the front surface 61a with respect to the imaging unit 32 at a certain point of time and the three-dimensional position and posture of the front surface 61a in an absolute coordinate system. In this embodiment, a case in which the computing unit 104 calculates a relative position and posture will be described. That is, when computing the position and posture from a certain information image, the computing unit 104 computes the distance of a reference point of the front surface 61a from the place where the surrounding image which is the source of the information image is captured. The reference point of the front surface 61a may be set anywhere and may be set at the end or center position of the front surface 61a. Further, the computing unit 104 computes the angle of the front surface 61a with respect to an optical axis of the imaging unit 32 when the surrounding image is captured. When the computing unit 104 knows the position and posture of the imaging unit 32 in the absolute coordinate system, it can compute the position and posture of the front surface 61a in the absolute coordinate system.

The computing unit 104 performs computation related to the pallet 61 on the basis of the relationship between the pixels of the information image and the dimensions of the front surface 61a of the pallet 61. That is, in the information image, the actual dimensions corresponding to one pixel are uniquely determined. Therefore, the computing unit 104 can detect the front surface 61a by reading the actual dimension information of the front surface 61a of the pallet 61 to be loaded and unloaded from the storage unit 108 and extracting an object matched with the actual dimension information from the information image.

Figure 11A:
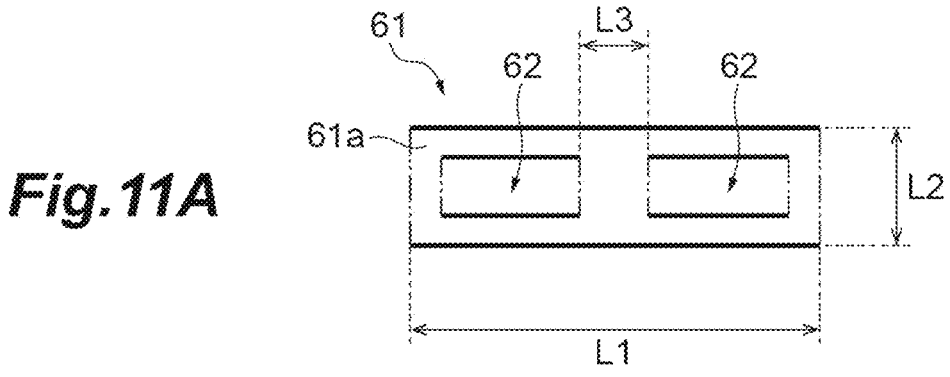
FIG. 11A illustrates an example of actual dimension information of the pallet.
Figure 11B:
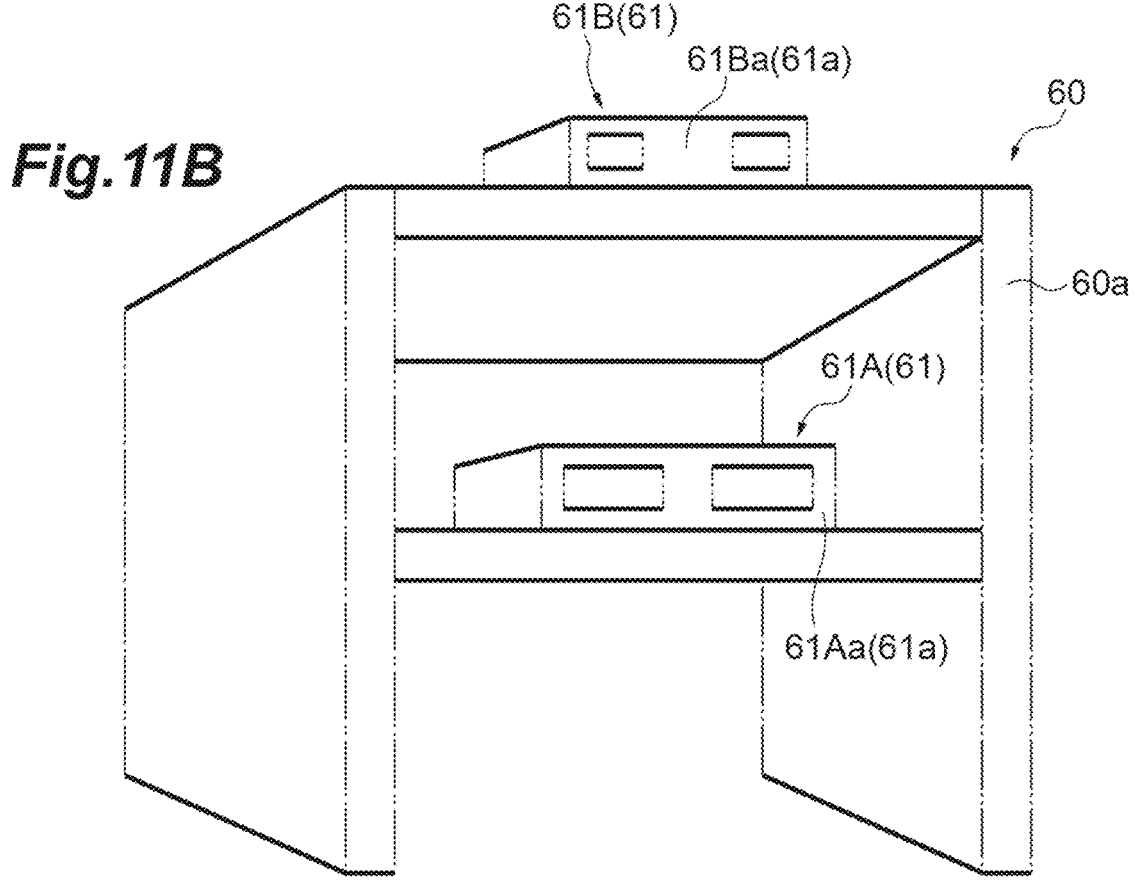
FIG. 11B is a diagram illustrating an aspect of an information image when template matching is performed.

The computing unit 104 performs template matching between information related to an edge portion of the front surface 61a of the pallet 61 detected from the information image and the actual dimension information of the front surface 61a stored in advance in the storage unit 108. FIG. 11A illustrates an example of the actual dimension information of the pallet 61. FIG. 11B is a diagram illustrating an aspect of the information image when the template matching is performed. As illustrated in FIG. 11A, the actual dimension information is an edge template that is set on the basis of the dimensional relationship of portions corresponding to the edge portions of the actual pallet 61 and includes, for example, a width dimension L1 of the front surface 61a of the pallet 61, a height dimension L2 of the front surface 61a, and a dimension L3 between the hole portions 62. When performing the template matching, the computing unit 104 detects the edge portion of the front surface 61a of the pallet 61 as an object to be detected as illustrated in FIG. 11A and detects an edge portion of an object, such as a structure, which is present in the information image as illustrated in FIG. 11B. The computing unit 104 detects the edge portion in the image using a known image processing method. In this case, the computing unit 104 distinguishes between an edge portion extending in the horizontal direction and an edge portion extending in the vertical direction. In FIGS. 11A and 11B, the edge portion extending in the horizontal direction is represented by a solid line, and the edge portion extending in the vertical direction is represented by a two-dot chain line. The computing unit 104 scans a template of the front surface 61a of the pallet 61 in the information image to extract an object matched with the template in the information image. The computing unit 104 detects the extracted object as the front surface 61a of the pallet 61 to be loaded and unloaded. In addition, the computing unit 104 reads the actual dimension information of the pallet 61A from the storage unit 108 when detecting the pallet 61A in FIG. 11B and reads the actual dimension information of the pallet 61B from the storage unit 108 when detecting the pallet 61B.

Figures 12A, 12B, 12C, 12D:
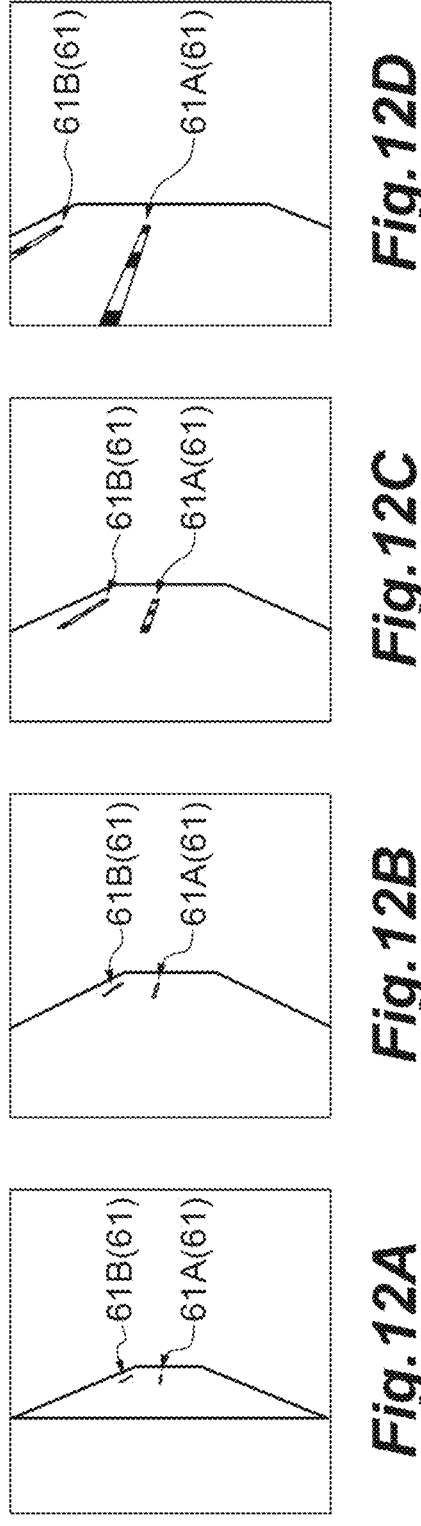
FIGS. 12A to 12D are images showing results of computing and specifying the position and posture of a front surface of the pallet in the surrounding images captured while the imaging unit is being moved together with feature planes.

As described above, when the computing unit 104 detects the front surface 61a of the pallet 61 to be loaded and unloaded in the information image, the front surface 61a of the pallet 61 and the feature plane when the information image is generated are substantially matched with each other. Since the three-dimensional position and posture of the feature plane SF are known, it is possible to compute the three-dimensional position and posture of the pallet 61 on the basis of the detected position of the pallet 61 in the information image and to specify the front surface 61a of the pallet 61 to be loaded and unloaded. FIGS. 12A to 12D are diagrams in which the results of computing and specifying the position and posture of the front surfaces 61Aa and 61Ba of the pallets 61A and 61B and the feature plane SF are extracted and illustrated. FIG. 12A illustrates the results at the position where the imaging unit 32 is 4 m away from the pallet 61A to be loaded and unloaded. FIG. 12B illustrates the results at the position where the imaging unit 32 is 3 m away from the pallet 61A. FIG. 12C illustrates the results at the position where the imaging unit 32 is 2 m away from the pallet 61A. FIG. 12D illustrates the results at the position where the imaging unit 32 is 1 m away from the pallet 61A. The computing unit 104 can compute the position and posture of the front surface 61Aa of the pallet 61A at each imaging position on the basis of the information obtained from the surrounding image.

Figure 13:
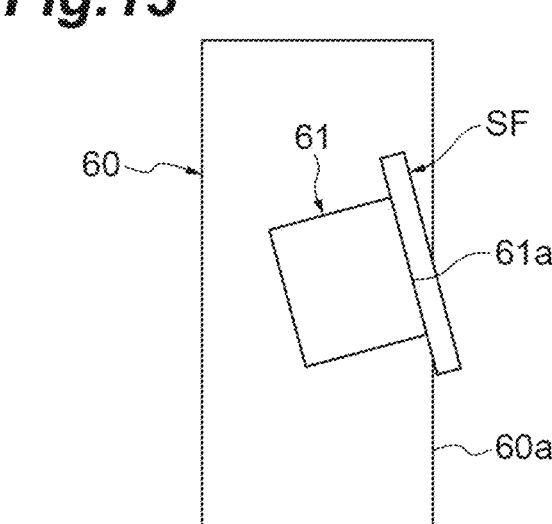
FIG. 13 is a schematic plan view illustrating a time-series positional relationship among the imaging unit, the shelf, and the pallet.
Figure 13:
Figure 13:
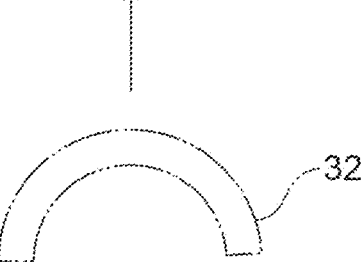

The adjustment unit 106 adjusts the conditions for creating the information image to improve the computation accuracy of the computing unit 104. In this embodiment, the adjustment unit 106 adjusts the position and inclination of the feature plane SF used when the information image is created as the conditions for creating the information image. Specifically, the computation accuracy of the computing unit 104 is improved by adjusting the equation of the three-dimensional plane related to the feature plane SF when the information image is created. Since the information image creation unit 103 has not detected the pallet 61 to be loaded and unloaded, the feature plane SF is set for the front surface 60a of the shelf 60 assuming that the front surface 61a of the pallet 61 to be loaded and unloaded is present on the same plane as the front surface 60a of the shelf 60 or in the vicinity of the plane. In this case, as illustrated in FIG. 9, the pallet 61 to be loaded and unloaded may be separated from the feature plane SF or may be inclined with respect to the feature plane SF. At that time, the shape and size of the front surface 61a of the pallet 61 in the information image slightly deviates from the actual shape and size of the front surface 61a. Therefore, after the pallet 61 to be loaded and unloaded is detected, the adjustment unit 106 calculates the feature plane SF matched with the front surface 61a of the pallet 61 as illustrated in FIG. 13. Specifically, the adjustment unit 106 changes parameters, which constitute the equation of the three-dimensional plane when the information image is created, to recalculate the position and posture of the front surface 61a of the pallet 61 in the information image and calculates parameters for giving an information image having the maximum degree of matching with the edge template. The calculated feature plane SF is matched with the front surface 61a of the pallet 61 more accurately than the front surface 60a of the shelf 60. Therefore, the computing unit 104 can compute the position and posture of the front surface 61a of the pallet 61 with high computation accuracy. Further, the adjustment unit 106 sets a feature plane SF, which is in a narrower range than the feature plane SF set for the front surface 60a of the shelf 60, for the front surface 61a of the pallet 61. Therefore, the information image created using the adjusted feature plane SF is an enlarged image of the front surface 61a of the pallet 61. As a result, the computing unit 104 can compute the position and posture of the front surface 61a of the pallet 61 with high computation accuracy. Further, in addition to adjusting both the position and the inclination, only the position may be adjusted, or only the inclination may be adjusted.

Figure 14:
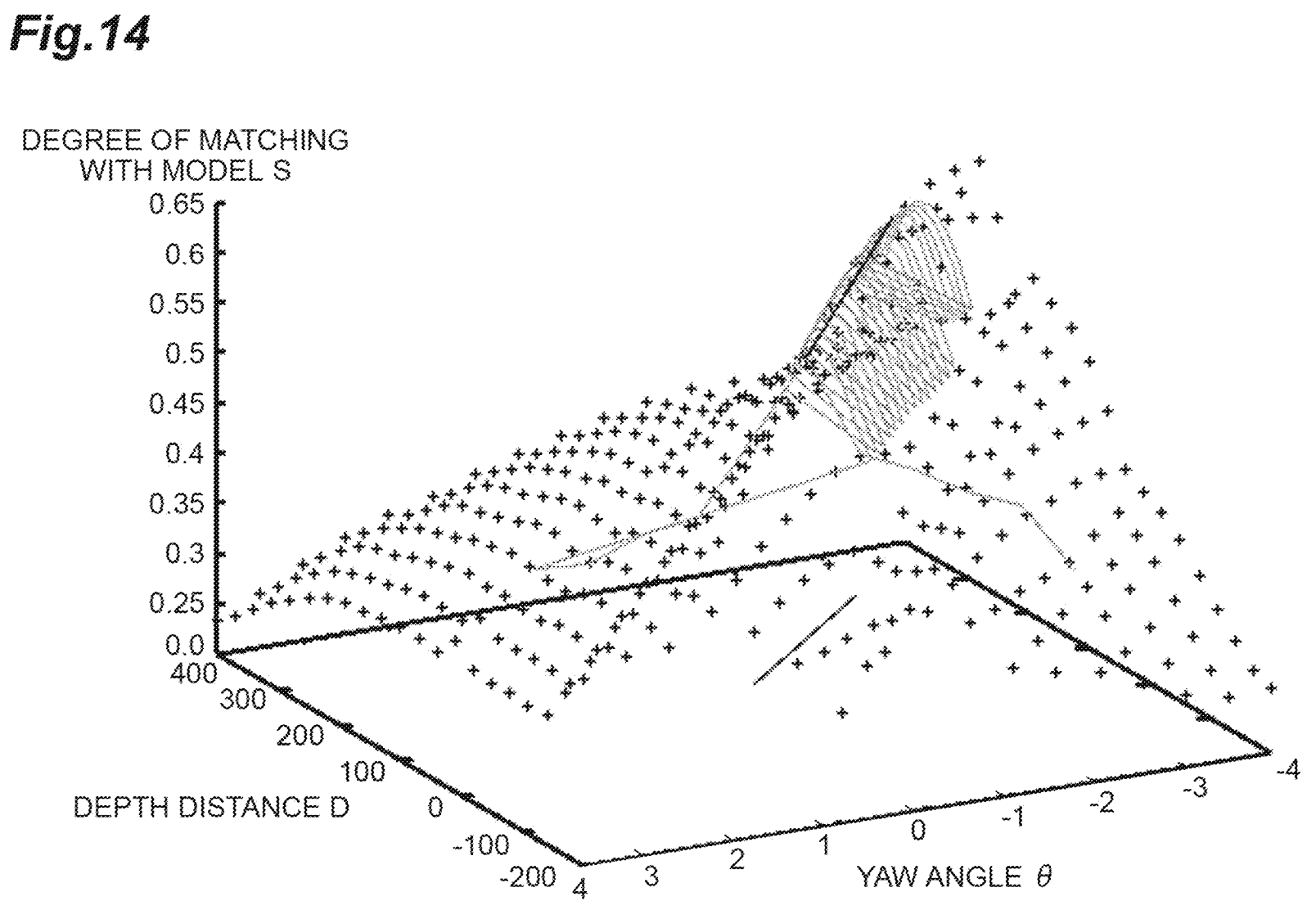

Here, FIG. 14 illustrates an example of a distribution of the degree of matching when θ and D are changed. A parameter on one horizontal axis of a three-dimensional graph is "θ" indicating the posture of the front surface 61a (feature plane SF) of the pallet 61 in the horizontal plane, that is, a yaw angle, a parameter on the other horizontal axis is "D" indicating a depth distance of the front surface 61a (feature plane SF) of the pallet 61, and a parameter on the vertical axis is the degree of matching. In addition, in the following description, the posture of the front surface 61a of the pallet 61 may be expressed as the "yaw angle". When the parameters related to the position and posture of the front surface 61a (feature plane SF) of the pallet 61 are changed, the degree of matching is changed. As a result, a mountain-like distribution illustrated in FIG. 14 is obtained. In the distribution, there is a local maximum value with the highest degree of matching. The adjustment unit 106 searches for the local maximum value and acquires a parameter corresponding to the local maximum value to understand the position and posture under condition that the degree of matching can be maximized. However, as illustrated in FIG. 14, a change in the degree of matching caused by a change in the yaw angle and a change in the degree of matching caused by a change in the depth distance are confusing, and the local maximum value of the degree of matching appears in an obtuse state. Therefore, there is a concern that the accuracy of the computation results of the position and posture of the front surface 61*a* of the pallet 61 adjusted by the adjustment unit 106 will be reduced. Further, when the adjustment unit 106 attempts to perform computation with high accuracy, the computation time increases. For this reason, the posture detection unit 109 that uniquely detects the yaw angle with higher accuracy is desired.

The posture detection unit 109 creates a yaw angle detection information image projected onto the horizontal plane of the upper or lower surface of the pallet on the basis of the computation result of the computing unit 104 and corrects the computation result in a case in which an error is included in the yaw angle based on the computation result of the computing unit 104.

Figures 15A, 15B:
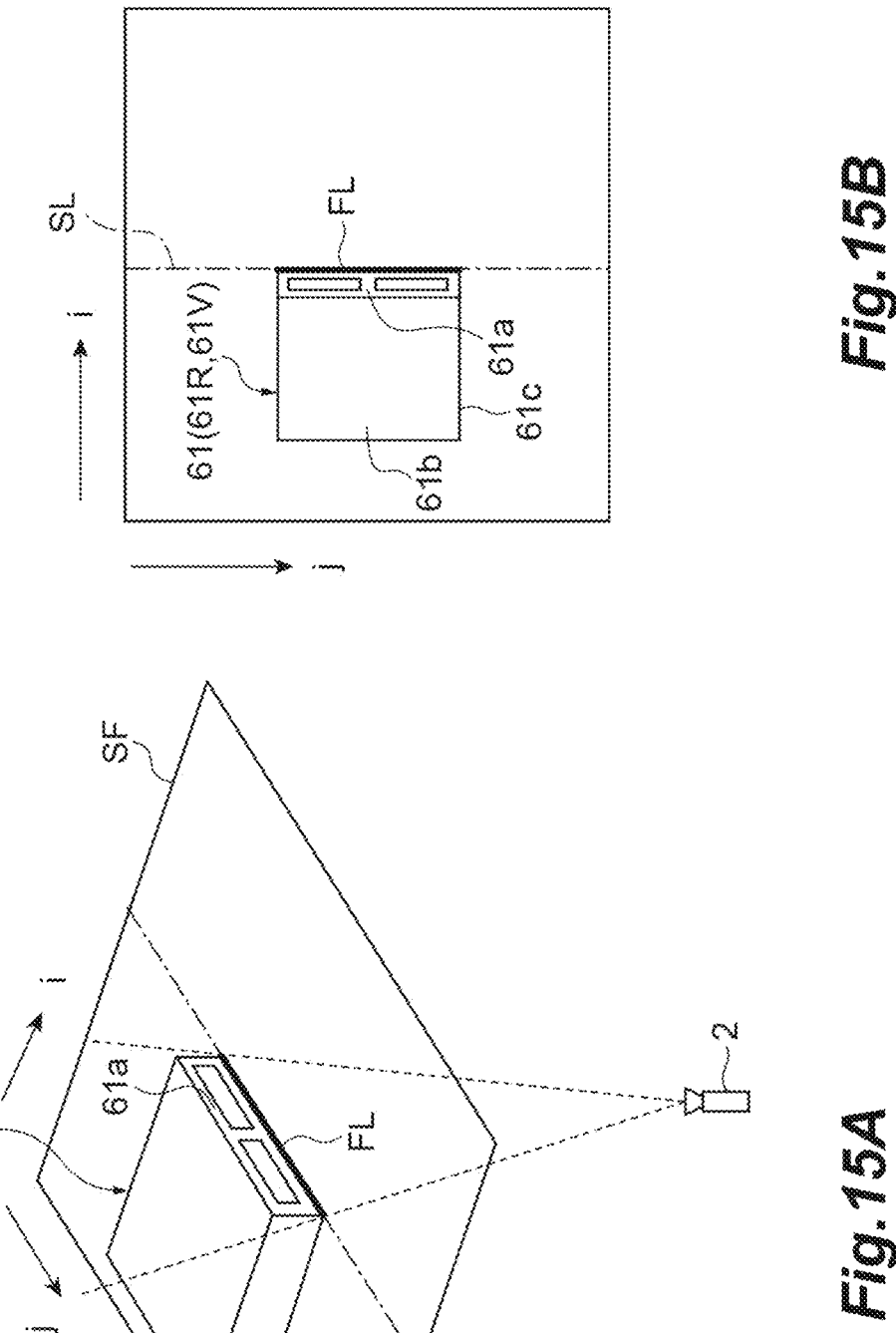
FIG. 15A illustrates an aspect in which a yaw angle detection information image is created using a horizontal plane including a lower surface as a projection plane.
FIG. 15B illustrates an example of the yaw angle detection information image having the horizontal plane including the lower surface as the projection plane.

The posture detection unit 109 issues a command to the information image creation unit 103 so as to create a yaw angle detection information image (second information image). Then, the information image creation unit 103 creates a yaw angle detection information image obtained by projecting information acquired at the position where the surrounding image has been acquired onto the horizontal plane including a feature line of the palette 61. Here, the feature line of the pallet 61 is a straight line that makes it possible to detect the yaw angle of the pallet 61 and is a straight line that is easy to recognize in the image. Specifically, in the pallet 61 below the imaging unit 32, since an intersection line between the front surface 61*a* and the lower surface 61*c* is a boundary line with the background, such as the floor (for example, see FIG. 17A), in the image, it is easy to recognize the intersection line in the image. Therefore, as illustrated in FIG. 15A, the intersection line between the front surface 61*a* and the lower surface 61*c* can be set as a feature line FL. In addition, the position of the pallet 61 in an imaging camera coordinate system is known by the computation result of the computing unit 104. Therefore, the control unit 110 can recognize whether the pallet 61 is present below or above the imaging unit 32.

The information image creation unit 103 creates a yaw angle detection information image, which has a horizontal plane including the lower surface 61*c* of the pallet 61 as the projection plane, for the pallet 61 below the imaging unit 32. FIG. 15B illustrates an example of the yaw angle detection information image having the horizontal plane including the lower surface 61*c* as the projection plane. The information image creation unit 103 creates the yaw angle detection information image based on the position and yaw angle of the pallet 61 on the basis of the computation result of the computing unit 104. The information image creation unit 103 creates the yaw angle detection information image using a method that is the same as that described with reference to FIGS. 7A and 7B and FIG. 8 except that the projection plane is changed from the front surface 60*a* of the shelf 60 to the lower surface 61*c* of the pallet 61.

In addition, in the pallet 61 above the imaging unit 32, since an intersection line between the front surface 61*a* and the upper surface 61*b* is a boundary line with the background of an upper structure (for example, a cargo loaded on the pallet) in the image, it is easy to recognize the intersection line in the image. Therefore, the intersection line between the front surface 61*a* and the upper surface 61*b* can be set as the feature line FL. The information image creation section 103 creates a yaw angle detection information image, which has a horizontal plane including the upper surface 61*b* of the pallet 61 as the projection plane, for the pallet 61 above the imaging unit 32.

In a case in which the computation result is adjusted by the adjustment unit 106, the information image creation unit 103 uses the adjusted computation result. Specifically, the information image creation unit 103 understands the position and posture of the feature line FL from the computation result. Then, the information image creation unit 103 creates a yaw angle detection information image on the basis of the understood information such that the feature line FL is disposed on a central perpendicular line in the image. In this case, the central perpendicular line is a reference line SL (reference line) for detecting the yaw angle of the pallet 61.

Figures 16A, 16B:
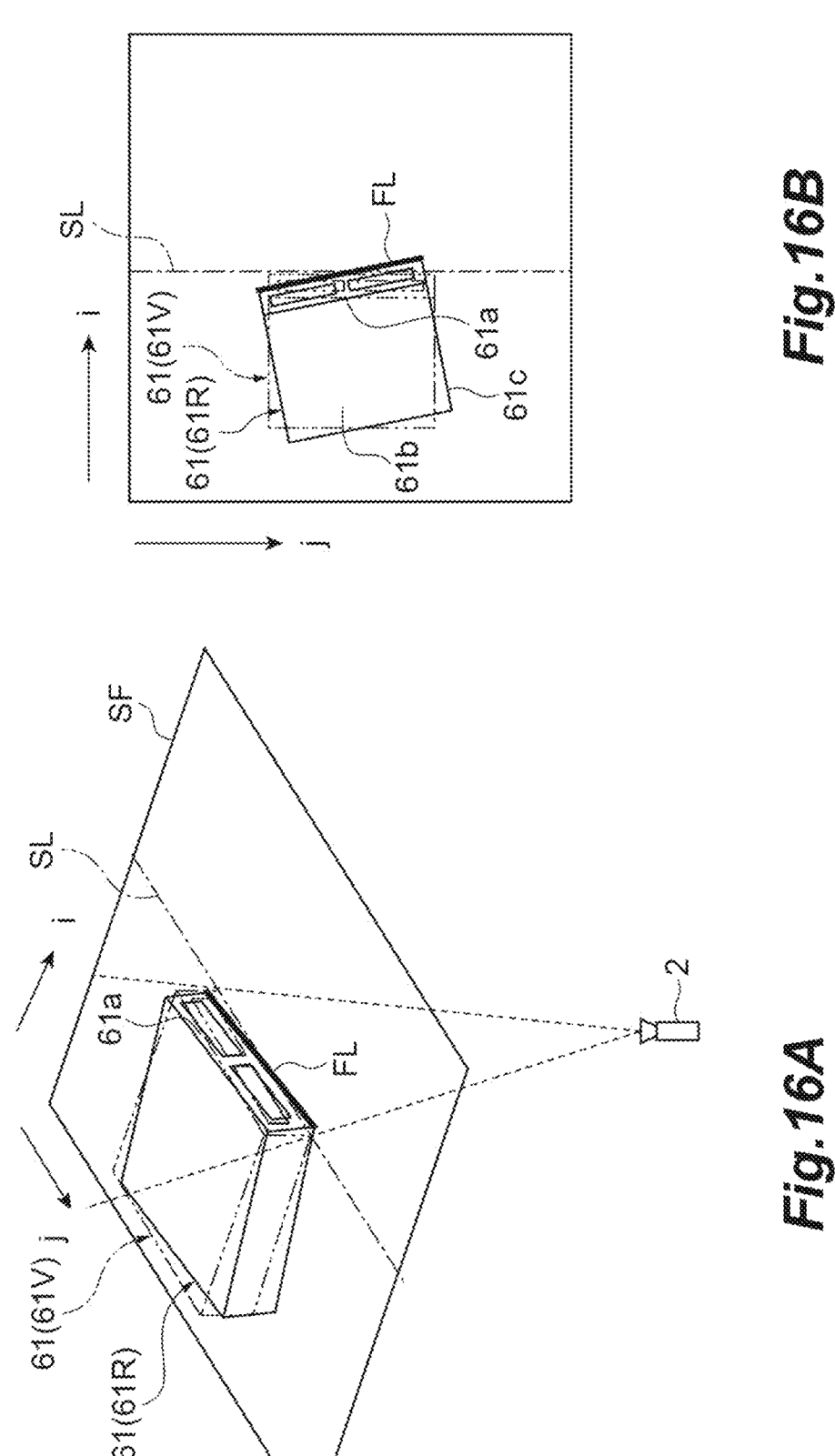
FIG. 16A illustrates an aspect in which a yaw angle detection information image is created using the horizontal plane including the lower surface as the projection plane.
FIG. 16B illustrates an example of the yaw angle detection information image having the horizontal plane including the lower surface as the projection plane.

Here, in FIGS. 15A and 15B and FIGS. 16A and 16B, the pallet 61 whose position and yaw angle have been estimated from the computation result of the computing unit 104 is represented by "61V", and the actual pallet 61 is represented by "61R". FIGS. 15A and 15B illustrate an aspect in which the estimated position and yaw angle of the pallet 61V are matched with the position and yaw angle of the actual pallet 61R. FIGS. 16A and 16B illustrates an aspect in which the estimated yaw angle of the pallet 61V is different from the yaw angle of the actual pallet 61R.

As illustrated in FIG. 15B, in a case in which the estimated position and yaw angle of the pallet 61V are matched with the position and yaw angle of the actual pallet 61R, the feature line FL of the actual pallet 61R is disposed on the reference line SL. On the other hand, as illustrated in FIG. 16B, in a case in which the estimated yaw angle of the pallet 61V deviates from the yaw angle of the actual pallet 61R, the feature line FL of the actual pallet 61R is disposed to be inclined with respect to the reference line SL. A difference in angle between the feature line FL and the reference line SL is a difference between the yaw angle based on the computation result and the yaw angle of the actual pallet 61R.

As described above, the posture detection unit 109 detects the feature line FL from the yaw angle detection information image and detects the yaw angle of the pallet 61 on the basis of the difference in angle between the feature line FL and the reference line SL in the yaw angle detection information image.

Specifically, the posture detection unit 109 disposes a boundary portion of a feature part estimated in advance in the palette 61 at any position of the yaw angle detection information image in the yaw angle detection information image. In this embodiment, the boundary portion is disposed at the center of the yaw angle detection information image. In addition, the term "disposed at any position" described here means that, when the feature line FL is detected from a boundary portion EG of the estimated feature part, the boundary portion is disposed at a position where a region in which the feature part is present and a region in which the feature part is not present can be easily recognized. In this embodiment, the feature part is an end portion 61*x* of the pallet 61 estimated from a presence candidate for the pallet 61 detected in the information image. Furthermore, an edge portion 61*xa* of the end portion 61*x* corresponds to the boundary portion EG. The yaw angle detection information image is expressed in monochrome. As illustrated in FIG. 17A, the vicinity of a lower end of the front surface 61*a* of the pallet 61 is the end portion 61*x* as the feature part.

Therefore, the edge portion 61xa of the front surface 61a is disposed in the vicinity of the reference line SL of the yaw angle detection information image. In addition, at this time, since the accuracy of detecting the posture of the pallet 61 is not high, the edge portion 61xa of the front surface 61a projected on the basis of this information may deviate from or be inclined with respect to the reference line SL. It is assumed that a region in which the end portion 61x of the pallet 61, which is the feature part, is present is a first region E1. Further, it is assumed that a region in which the feature part is not present, that is, a background region of the palette 61 is a second area E2.

Figure 17B:
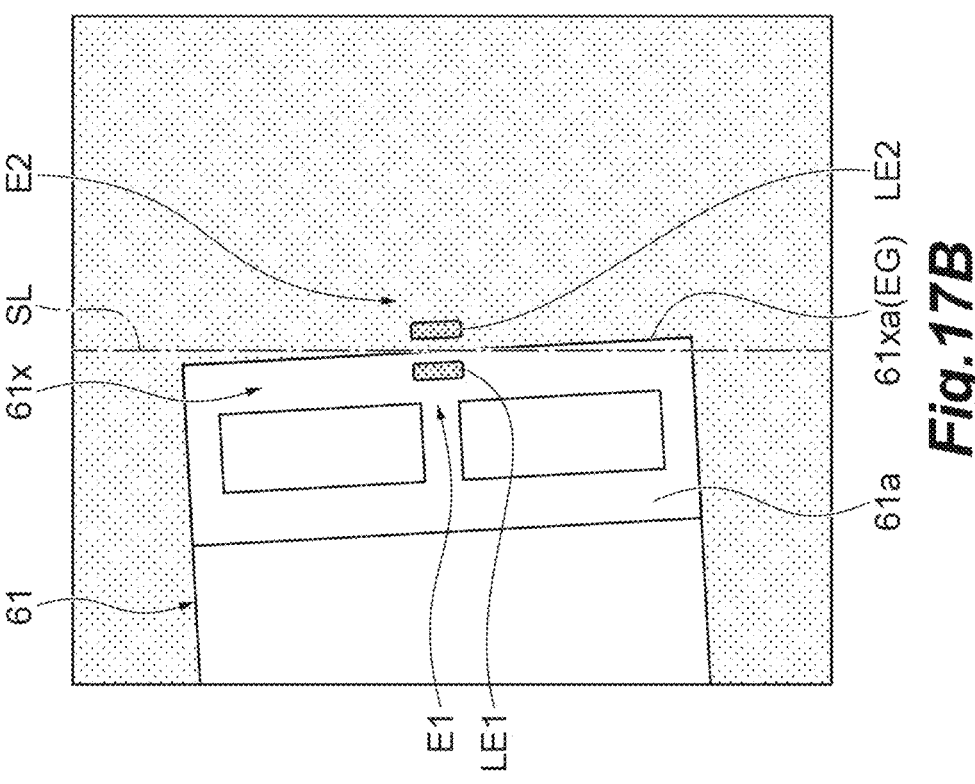
FIGS. 17A and 17B are conceptual diagrams illustrating content of a process for detecting a feature line.
Figure 17A:
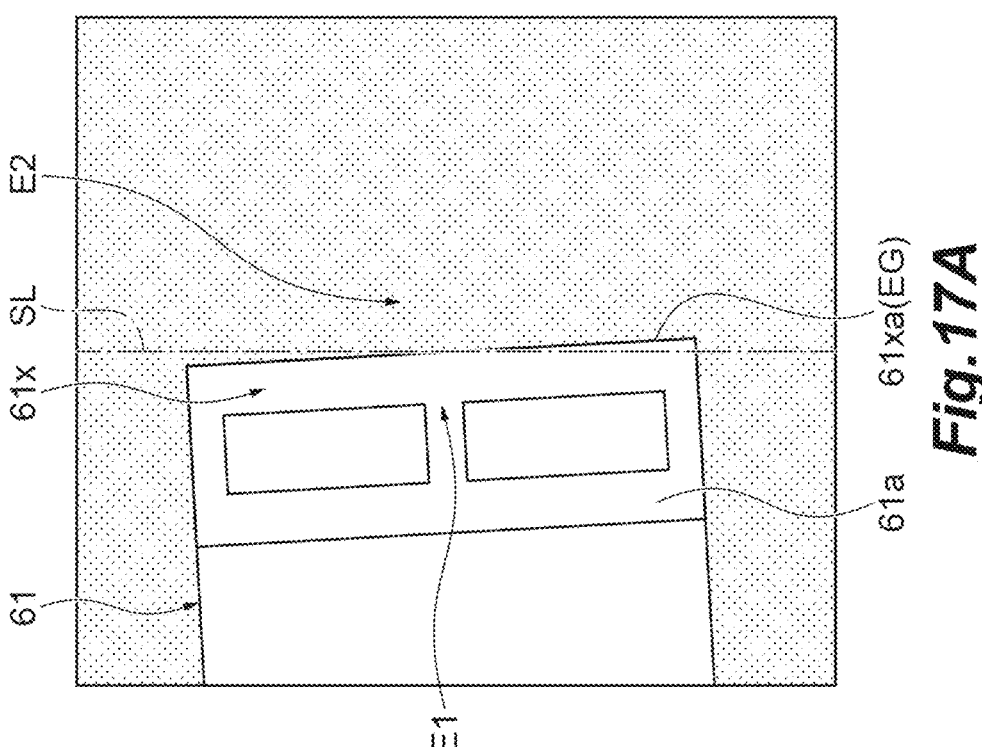

As illustrated in FIG. 17B, the posture detection unit 109 sets a first local region LE1 selected from the first region E1 and a second local region LE2 selected from the second region E2. The first local region LE1 and the second local region LE2 are set to face each other with the reference line SL interposed therebetween. Further, the first local region LE1 and the second local region LE2 are set at positions that are spaced apart from the reference line SL by a predetermined number of pixels. The first local region LE1 and the second local region LE2 are set at a substantially central position of the reference line SL in a direction in which the reference line SL extends.

The posture detection unit 109 uses an average value of an acquisition result of a visual parameter in the first local region LE1 and an acquisition result of a visual parameter in the second local region LE2 as a threshold value for determining a change in the visual parameter. The visual parameter is a pixel value. The visual parameter is a gray value in a case in which the yaw angle detection information image is expressed in monochrome. The gray value is a value indicating the brightness of various components such as R, G, and B.

Figure 18B:
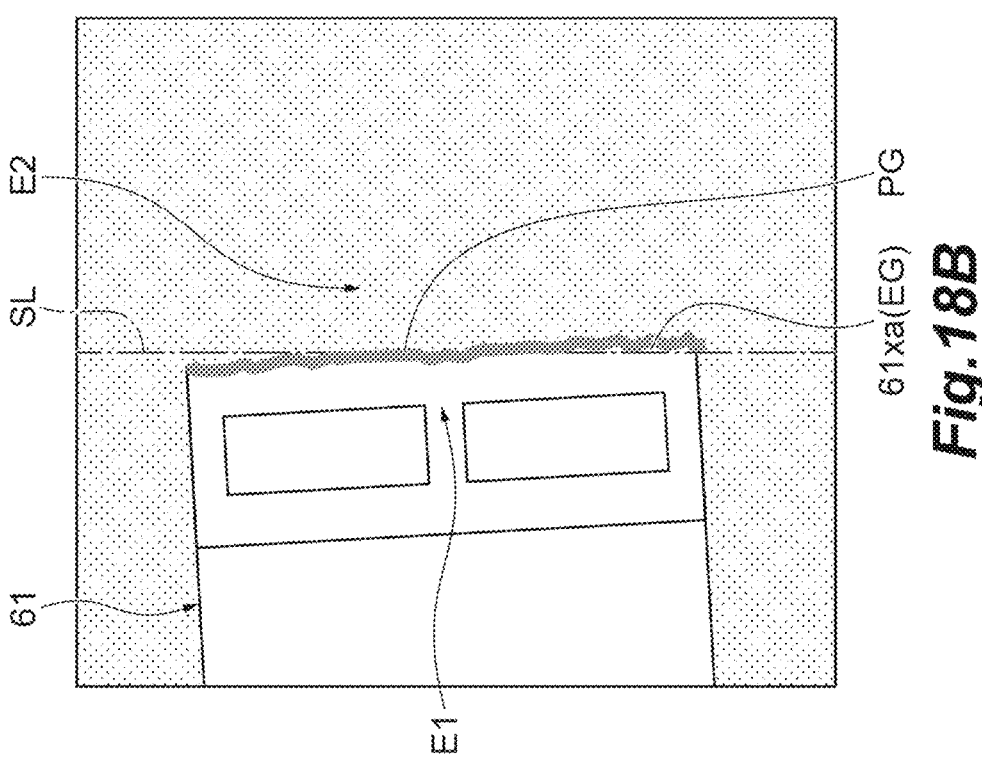
FIGS. 18A and 18B are conceptual diagrams illustrating the content of the process for detecting the feature line.

As illustrated in FIG. 18B, the posture detection unit 109 scans the yaw angle detection information image across the first region E1 and the second region E2 to detect a change in the visual parameter. The posture detection unit 109 scans the yaw angle detection information image in the drawing starting from the upper right side while acquiring the gray value at each position. Scanning per line is performed from the second region E2 to the first region E1. The posture detection unit 109 calculates notation information indicating the edge portion 61xa of the palette 61 on the basis of the change in the visual parameter. In each scanning row, the posture detection unit 109 detects the pixel, whose gray value first falls below (exceeds) the threshold value, as a pixel on the edge portion 61xa and disposes the notation information. As illustrated in FIG. 18B, the notation information is a point group PG which is boundary candidate points. The posture detection unit 109 plots points at the detected pixels. Therefore, the point group PG indicating the edge portion 61xa is formed by the plotted points.

Figure 19:
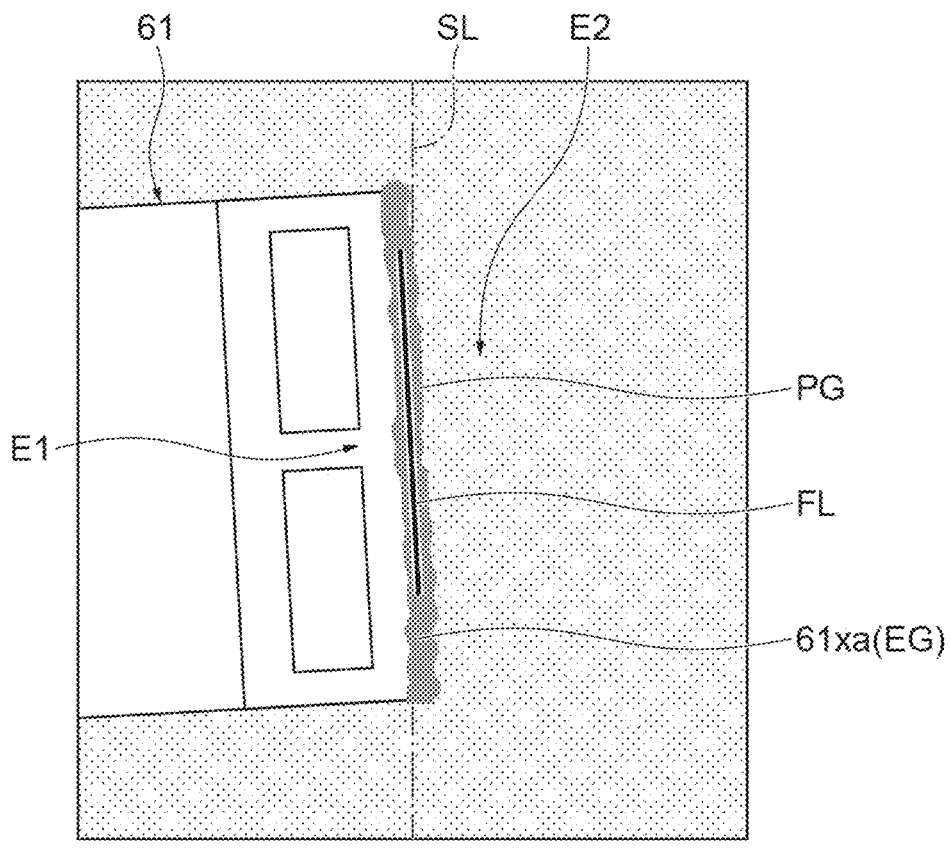
FIG. 19 is a conceptual diagram illustrating the content of the process for detecting the feature line.

As illustrated in FIG. 19, the posture detection unit 109 detects the feature line FL on the basis of the point group PG which is the notation information. The posture detection unit 109 applies RANSAC to the point group PG to detect the feature line FL.

The posture detection unit 109 detects the posture on the basis of a difference in angle between the feature line FL and the reference line SL in the yaw angle detection information image. The posture detection unit 109 computes the difference in angle between the feature line FL and the reference line SL. The posture detection unit 109 corrects the yaw angle such that the computed difference in the yaw angle is eliminated. Therefore, the yaw angle detection information image is corrected to an information image in which the feature line FL is matched with the reference line SL. The computing unit 104 determines the posture of the front surface 61a of the pallet 61 on the basis of the corrected yaw angle. Then, the computing unit 104 calculates the three-dimensional position of the front surface 61a of the pallet 61 from the information image in which the front surface 61a is the feature plane SF.

The operation control unit 107 controls the position or posture of the vehicle body 51 on the basis of the information related to the position and posture of the front surface 61a of the pallet 61 computed by the computing unit 104. The operation control unit 107 performs control on the basis of the position and posture estimated after the posture detection unit 109 corrects the yaw angle. Since the operation control unit 107 understands the position and posture of the front surface 61a of the pallet 61 to be loaded and unloaded at the time when the forklift 50 travels on the track TL1, it controls the turning position or the turning track (track TL2) of the forklift 50 such that the forklift 50 can smoothly insert the fork 25 into the hole portion of the front surface 61a of the pallet 61. In addition, the operation control unit 107 may be configured as a control unit that is separated from the control unit 110 of the item detection device 100. In this case, the control unit 110 of the item detection device 100 outputs the computation result to the control unit of the operation control unit 107, and the operation control unit 107 performs operation control on the basis of the computation result of the item detection device 100.

Figure 22:
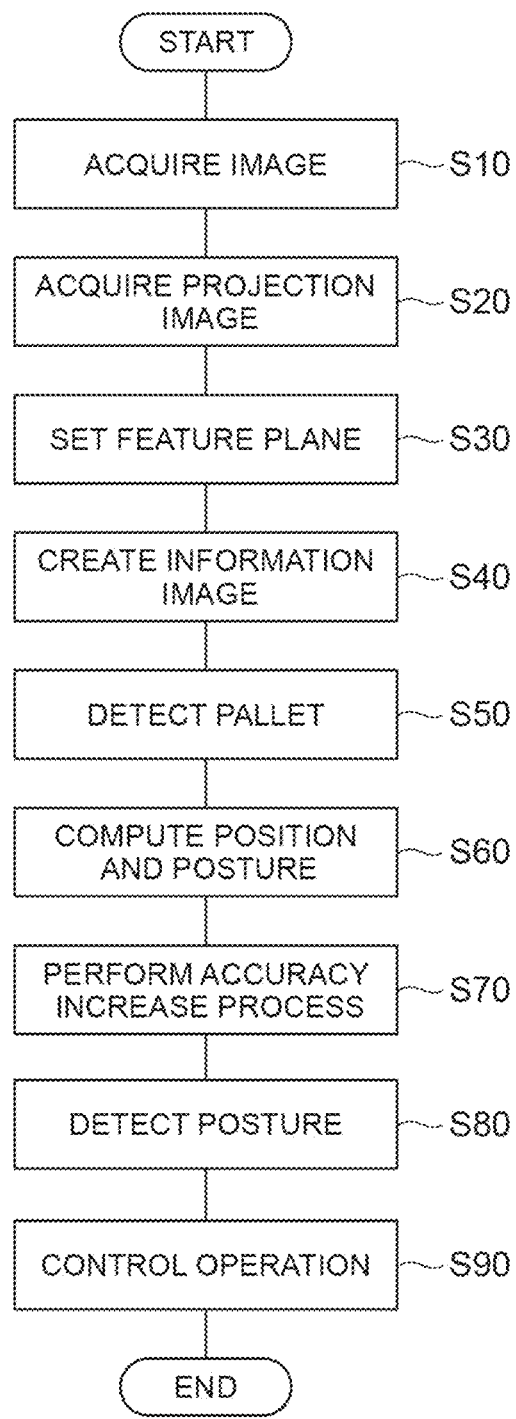
FIG. 22 is a flowchart illustrating content of an item detection method.

Next, the content of an item detection method according to this embodiment will be described with reference to FIG. 22. FIG. 22 is a flowchart illustrating the processing content of the item detection method. The processing content illustrated in FIG. 22 is executed by the control unit 110 of the item detection device 100. However, the processing content illustrated in FIG. 22 is only an example, and the invention is not limited thereto.

As illustrated in FIG. 22, the image acquisition unit 101 of the control unit 110 executes an image acquisition step of acquiring a surrounding image obtained by capturing the surroundings of the vehicle body 51 (step S10). In the image acquisition step S10, the image acquisition unit 101 acquires the image captured by the imaging unit 32 as the surrounding image. Then, the feature plane setting unit 102 executes a projection image acquisition step of acquiring a projection image projected onto the moving plane DF that moves in synchronization with the movement of the place where the surrounding image is captured (step S20). Then, the feature plane setting unit 102 executes a feature plane setting step of setting the feature plane SF in which the features of the front surface 61a of the pallet 61 to be loaded and unloaded are shown (step S30). The feature plane setting unit 102 generates the three-dimensional restored shape of the pallet 61 and the shelf 60 on the basis of the projection image on the moving plane DF created from the surrounding image and sets the feature plane SF for the front surface 60a of the shelf 60 on the basis of the restored shape (see FIG. 9).

The information image creation unit 103 executes an information image creation step of creating an information image in which information related to the front surface 61a of the pallet 61 has been converted into an easily recognizable state on the basis of the surrounding image (step S40). In the information image creation step S40, the information image creation unit 103 creates the information image using the feature plane SF. The information image creation unit 103 associates dimensions corresponding to one pixel with the information image.

The computing unit 104 executes a pallet detection step of detecting the pallet 61 to be loaded and unloaded on the basis of the information image (step S50). The computing unit 104 executes a computing step of computing the position and posture of the front surface 61a of the pallet 61 on the basis of the information image (step S60). In the computing step S60, the computing unit 104 performs computation on the basis of the relationship between the pixels of the information image and the dimensions of the front surface 61a of the pallet 61. The computing unit 104 performs the template matching between information related to an edge portion of the front surface 61a of the pallet 61 detected from the information image and the actual dimension information of the front surface 61a stored in advance in the storage unit 108 (see FIGS. 11A and 11B). Therefore, the computing unit 104 detects the pallet 61 to be loaded and unloaded and computes the position and posture of the front surface 61a.

The control unit 110 executes an accuracy increase processing step of increasing the computation accuracy of the computing unit 104 (step S70). In the accuracy increase processing step S70, the adjustment unit 106 adjusts the parameters of the equation of the three-dimensional plane related to the feature plane SF when the information image is created. The adjustment unit 106 calculates a parameter for maximizes the degree of matching with the edge template, detects the equation of the three-dimensional plane for calculating the information image having the highest degree of matching, and sets the feature plane SF (see FIG. 13). Then, the information image creation unit 103 creates an information image using the adjusted feature plane SF. The computing unit 104 computes the position and posture of the front surface 61a of the pallet 61 on the basis of the information image created using the adjusted feature plane SF.

The posture detection unit 109 executes a posture detection step of detecting the posture of the front surface 61a of the pallet 61 on the basis of the computation result in the computing step S60 whose accuracy has been increased in the accuracy increase processing step S70 (step S80). In the posture detection step S80, the information image creation unit 103 creates a yaw angle detection information image obtained by projecting the information acquired at the position where the surrounding image has been acquired onto the horizontal plane including the feature line FL of the palette 61. In addition, in the posture detection step S80, the posture detection unit 109 detects the feature line FL from the yaw angle detection information image and detects the posture on the basis of a difference in angle between the feature line FL and the reference line SL in the yaw angle detection information image. The posture detection unit 109 corrects the yaw angle on the basis of the difference in angle. Therefore, the computing unit 104 determines the posture on the basis of the corrected yaw angle and calculates the position of the front surface 61a of the pallet 61 on the basis of the yaw angle.

Figure 20:
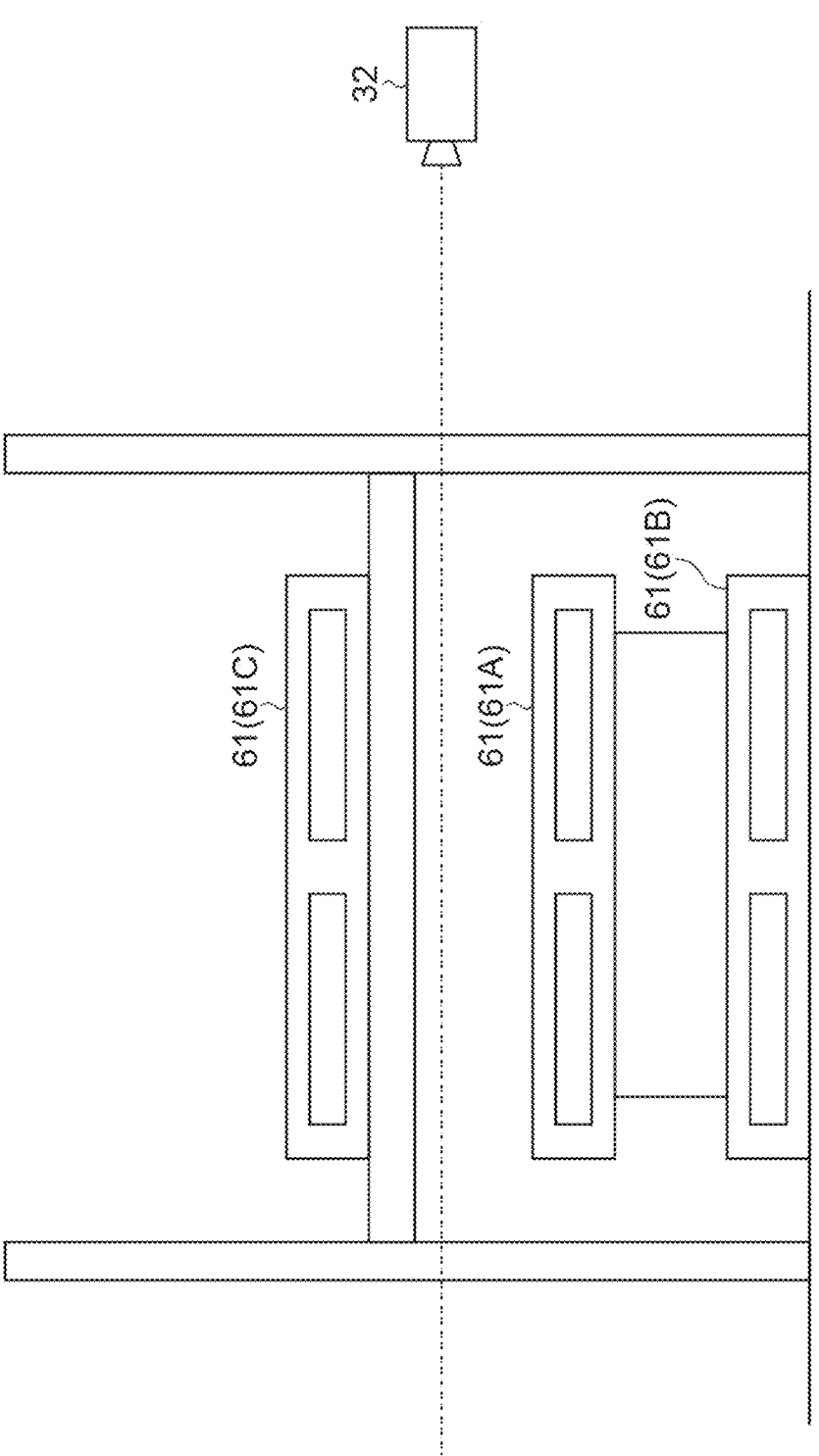
FIG. 20 is a diagram illustrating a positional relationship between a camera and the pallet.

In addition, as illustrated in FIG. 20, lower surface projection is performed on the pallet 61 (61A or 61B) that is present at a position below the imaging unit 32, and upper surface projection is performed on the palette 61 (61C) that is present at a position above the imaging unit 32. For the pallet 61 that is present at the position below the imaging unit 32, since a difference in gray value between the pallet 61 and the floor is likely to occur, the feature part is the end portion of the pallet.

Figure 18A:
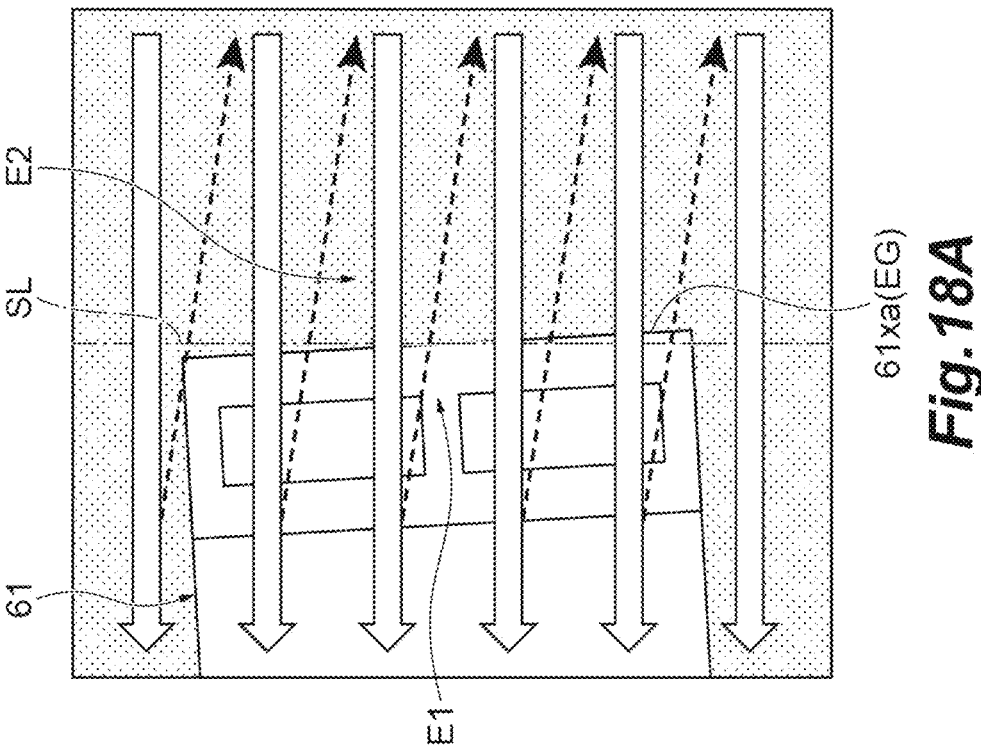
Figure 21:
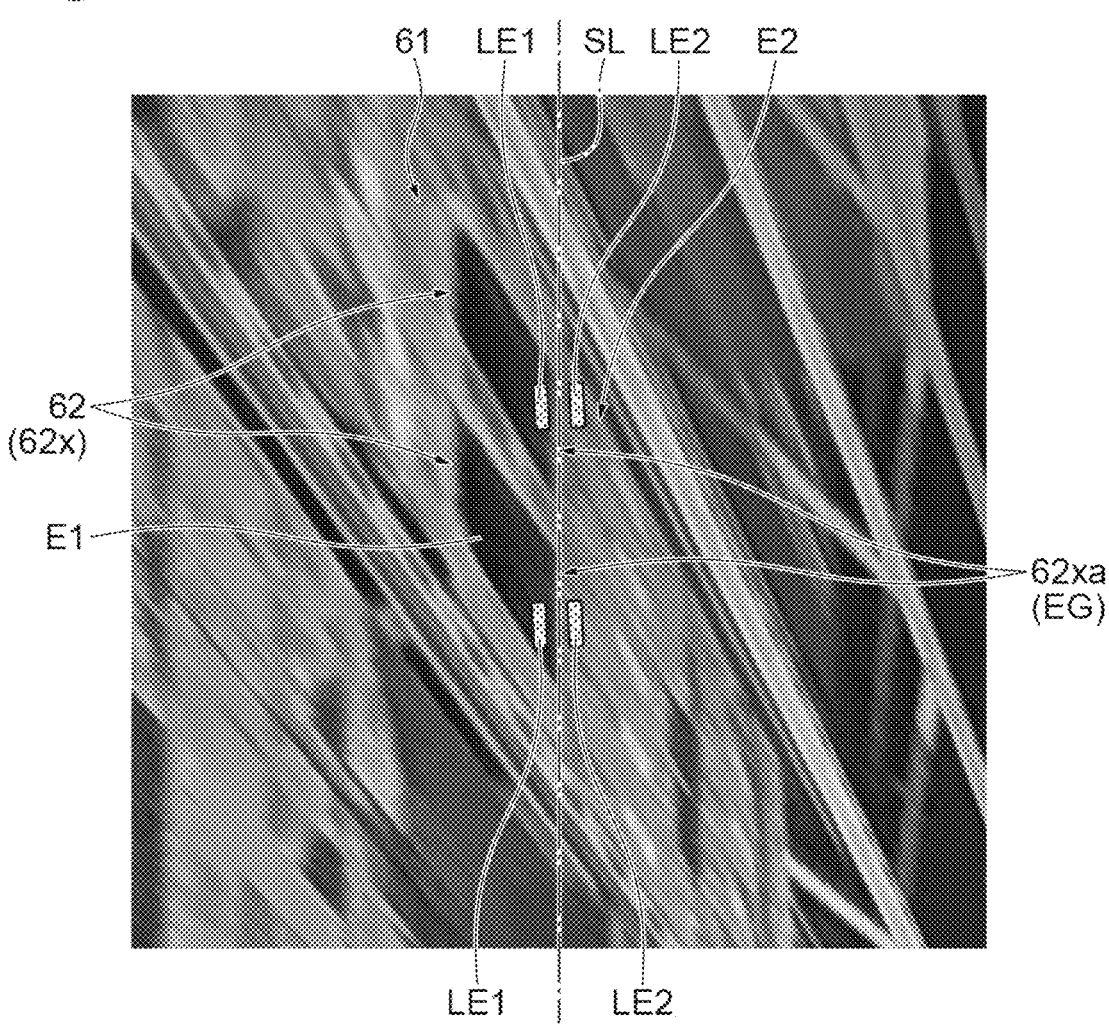
FIG. 21 is a conceptual diagram illustrating the content of the process for detecting the feature line.

However, as illustrated in FIG. 21, the boundary of the pallet 61 that is present at the position above the imaging unit 32 may be unclear due to, for example, a cargo whose background has the same gray value as the pallet. In this case, an end portion 62x of the shadow of the hole portion 62 of the pallet 61 estimated from the presence candidate for the pallet 61 detected in the information image can be used as the feature part. An edge portion 62xa of the end portion 62x corresponds to the boundary portion EG. The pallet 61 has a pair of hole portions 62. Therefore, a set of the first local region LE1 and the second local region LE2 is set for the edge portion 62xa of each hole portion 62. The subsequent process is the same as the process illustrated in FIGS. 18A and 18B and FIG. 19.

The operation control unit 107 executes an operation control step of controlling the position or posture of the vehicle body 51 on the basis of the information related to the position and posture of the front surface 61a of the pallet 61 computed by the computing unit 104 (step S90). In the operation control step S90, the operation control unit 107 controls the turning position or turning track (track TL2) of the forklift 50 such that the forklift 50 can smoothly insert the fork 25 into the hole portion of the front surface 61a of the pallet 61. In this way, the process illustrated in FIG. 22 is completed. In addition, some of the above-described processes may be omitted as appropriate. For example, the accuracy increase processing step S70 may be omitted. Further, the posture detection step S80 may be executed first and then the accuracy increase processing step S70 may be executed.

Next, the operation and effect of the item detection device 100, the item detection method, and the forklift 50 according to this embodiment will be described.

The item detection device 100 according to this embodiment includes the image acquisition unit 101 that acquires the surrounding image obtained by capturing the surroundings of the item detection device 100 and the information image creation unit 103 that creates the information image in which the information related to the front surface 61a of the pallet 61 has been converted into an easily recognizable state. For example, in some cases, it is difficult to directly detect an item from an image showing the aspect of the surroundings of the item detection device 100, depending on the distance and positional relationship between the item detection device 100 and the pallet 61. Specifically, as illustrated in FIG. 5, in the surrounding image of the fisheye camera, the shelf 60 and the pallet 61 are shown in a curved state. It is difficult to directly specify the pallet 61 from the surrounding image. In contrast, the information image creation unit 103 can create an information image suitable for detecting the front surface 61a of the pallet 61 on the basis of the surrounding image obtained by imaging the surroundings of the item detection device 100. Specifically, as illustrated in FIGS. 10A and 10B, in the information image, the front surface 61a of the pallet 61 is shown in a shape as if it is imaged from the front, and the size of the front surface 61a is constant regardless of the imaging position. Further, the item detection device 100 includes the computing unit 104 that computes the position and posture of the front surface 61a of the pallet 61 on the basis of the information image. In this way, the computing unit 104 performs computation through the information image suitable for detecting the front surface 61a of the pallet 61 to compute the position and posture of the front surface 61a in a stage before the item detection device 100 approaches the vicinity of the pallet 61. Therefore, it is possible to detect the item to be loaded and unloaded, regardless of the positional relationship with the item.

Here, the item detection device 100 includes the posture detection unit 109 that detects the posture of the front surface 61a of the pallet 61 on the basis of the computation result of the computing unit 104. The information image creation unit 103 creates the yaw angle detection information image obtained by projecting the information acquired at the position where the surrounding image has been acquired onto the horizontal plane including the feature line FL of the palette 61. The yaw angle detection information image is an information image having the horizontal plane as the projection plane. Therefore, the feature line FL of the pallet 61 in the yaw angle detection information image is a line that makes it easy to detect the yaw angle, which is an azimuth angle in the horizontal plane, in the posture of the pallet 61. The posture detection unit 109 detects the feature line FL from the yaw angle detection information image and detects the posture on the basis of a difference in angle between the feature line FL and the reference line SL in the yaw angle detection information image. It is possible to correct the posture of the pallet 61 based on the computation result of the computing unit 104 on the basis of the difference in angle.

In addition, the posture detection unit 109 disposes the boundary portion of the feature part estimated in advance in the palette 61 at any position of the yaw angle detection information image in the yaw angle detection information image. In this embodiment, since the boundary portion of the feature part that is a candidate for the feature line FL is disposed at the center of the yaw angle detection information image, it is easy to distinguish between the first region E1 which is a region in which the end portion 61x of the pallet 61, which is the feature part, is present and the second region E2 which is a region in which the feature part is not present. Therefore, it is easy to detect the feature line FL. The posture detection unit 109 scans the yaw angle detection information image across the first region E1 in which the feature part is present and the second region E2 in which the feature part is not present to acquire a change in the visual parameter. Therefore, it is possible to acquire information of the change in the visual parameter in the vicinity of the boundary portion of the feature part without omission. The posture detection unit 109 calculates notation information indicating the boundary portion of the palette 61 on the basis of the change in the visual parameter and detects the feature line FL on the basis of the notation information. Therefore, in the yaw angle detection information image, the notation information can be written in a portion in which the boundary portion of the pallet 61 is likely to be present. As a result, it is possible to accurately detect the feature line FL. In this way, it is possible to accurately detect the posture of the pallet 61 to be loaded and unloaded.

The visual parameter may be a gray value in a case in which the second information image is expressed in monochrome. In this case, since it is easy to acquire a change in the gray value in a monochrome image, it is possible to reduce a computational load.

The notation information may a point group, and the posture detection unit 109 may apply RANSAC to the point group to detect the feature line FL. Since RANSAC is strong in response in a case in which outliers are present, it is possible to robustly detect the feature line FL.

The item may be the pallet 61, and the feature part may be the end portion 61x of the pallet 61 estimated from the presence candidate for the pallet 61 detected in the first information image. Since the end portion 61x of the pallet 61 has a linear shape, the end portion 61x is easily detected as the feature line FL.

The item may be the pallet 61, and the feature part may be the end portion 62x of the shadow of the hole portion 62 of the pallet 61 estimated from the presence candidate for the pallet 61 detected in the first information image. Since the hole portion 62 of the pallet 61 is shaded and is likely to be linear, the hole portion 62 is easily detected as the feature line FL.

The posture detection unit 109 may use the average value of the acquisition result of the visual parameter in the first local region LE1 selected from the first region E1 and the acquisition result of the visual parameter in the second local region LE2 selected from the second region E2 as the threshold value for determining a change in the visual parameter.

An item detection method according to an aspect of this embodiment detects the pallet 61 to be loaded and unloaded and includes an image acquisition step of acquiring a surrounding image obtained by capturing surroundings, an information image creation step of creating a first information image, in which information related to a part to be loaded and unloaded in the pallet 61 has been converted into an easily recognizable state, on the basis of the surrounding image, a computing step of computing at least one of a position and a posture of the part to be loaded and unloaded on the basis of the first information image, and a posture detection step of detecting the posture of the part to be loaded and unloaded on the basis of a computation result in the computing step. In the posture detection step, a yaw angle detection information image obtained by projecting information acquired at a position where the surrounding image has been acquired onto a horizontal plane including the feature line FL of the palette 61 is created, the feature line FL is detected from the yaw angle detection information image, and the posture is detected on the basis of a difference in angle between the feature line FL and the reference line SL in the yaw angle detection information image.

According to the item detection method, it is possible to obtain the same operation and effect as those of the item detection device 100.

The forklift 50 according to this embodiment includes the item detection device 100.

According to the forklift 50, it is possible to obtain the same operation and effect as those of the item detection device 100.

Figures 23A, 23B:
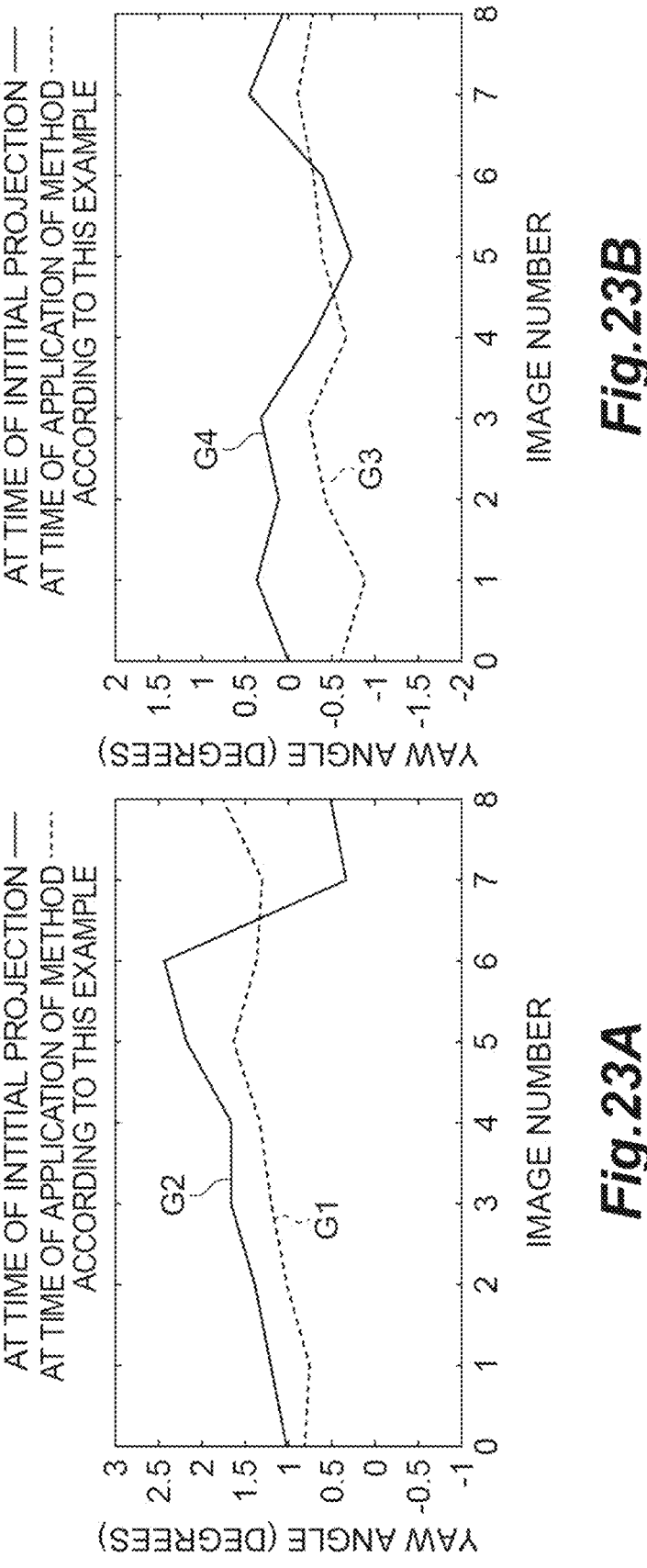
FIGS. 23A and 23B are graphs illustrating comparison between estimation results of an example and a comparative example.

FIGS. 23A and 23B illustrate experimental results in a case in which the yaw angle of the pallet 61 is corrected using the invention. FIG. 23A is a graph illustrating the result of estimating the yaw angle of the pallet 61A illustrated in FIG. 20, and FIG. 23B is a graph illustrating the result of estimating the yaw angle of the pallet 61B illustrated in FIG. 20. Graphs G1 and G3 according to the example in FIGS. 23A and 23B illustrate the yaw angles estimated by the item detection method according to the above-described embodiment. Graphs G2 and G4 according to a comparative example in FIGS. 23A and 23B illustrate the yaw angles estimated at the time of initial projection during the item detection method according to the above-described embodiment. The yaw angle estimated at the time of the initial projection is the estimation result estimated at the stage of the computing step S60 in the above-described embodiment. In addition, the estimation was performed using a plurality of (here, nine) images. Since the experiment is conducted without changing the yaw angle with respect to the camera, a correct answer is that the yaw angle is almost constant in the nine images. As illustrated in FIGS. 23A and 23B, for both the pallets 61A and 61B, the graphs G1 and G3 according to the example had less variation.

The invention is not limited to the above-described embodiment.

For example, in the above-described embodiment, the reach-type forklift is given as an example of the industrial vehicle. However, the item detection device 100 may be applied to an industrial vehicle such as a counterbalance forklift or a forklift that can load and unload items to and from the shelf without changing the direction of the vehicle body. Further, the pallet 61 is given as an example of the item to be loaded and unloaded. However, for example, a corrugated board may be used as the item to be loaded and unloaded. Furthermore, the item detection device may be applied to an item transporting means of an automated warehouse, in addition to the industrial vehicle.

[Aspect 1]

There is provided an item detection device that detects an item to be loaded and unloaded. The item detection device includes: an image acquisition unit acquiring a surrounding image obtained by capturing surroundings of the item detection device; an information image creation unit creating a first information image, in which information related to a part to be loaded and unloaded in the item has been converted into an easily recognizable state, on the basis of the surrounding image; a computing unit computing at least one of a position and a posture of the part to be loaded and unloaded on the basis of the first information image; and a posture detection unit detecting the posture of the part to be loaded and unloaded on the basis of a computation result of the computing unit. The information image creation unit creates a second information image obtained by projecting the information acquired at a position where the surrounding image has been acquired onto a horizontal plane including a feature line of the item. The posture detection unit disposes a boundary portion of a feature part estimated in advance in the item at any position of the second information image in the second information image, scans the second information image across a first region in which the feature part is present and a second region in which the feature part is not present to acquire a change in a visual parameter, calculates notation information indicating the boundary portion of the item on the basis of the change in the visual parameter, detects the feature line on the basis of the notation information, and detects the posture on the basis of a difference in angle between the feature line and a reference line in the second information image.

[Aspect 2]

In the item detection device according to Aspect 1, the visual parameter is a gray value in a case in which the second information image is expressed in monochrome.

[Aspect 3]

In the item detection device according to Aspect 1 or 2, the notation information is a point group, and the posture detection unit applies RANSAC to the point group to detect the feature line.

[Aspect 4]

In the item detection device according to any one of Aspects 1 to 3, the item is a pallet, and the feature part is an end portion of the pallet estimated from a presence candidate for the pallet detected in the first information image.

[Aspect 5]

In the item detection device according to any one of Aspects 1 to 3, the item is a pallet, and the feature part is an end portion of a shadow of a hole portion of the pallet estimated from a presence candidate for the pallet detected in the first information image.

[Aspect 6]

In the item detection device according to any one of Aspects 1 to 5, the posture detection unit uses an average value of an acquisition result of the visual parameter in a first local region selected from the first region and an acquisition result of the visual parameter in a second local region selected from the second region as a threshold value for determining the change in the visual parameter.

[Aspect 7]

There is provided an item detection method for detecting an item to be loaded and unloaded. The item detection method includes: an image acquisition step of acquiring a surrounding image obtained by capturing surroundings; an information image creation step of creating a first information image, in which information related to a part to be loaded and unloaded in the item has been converted into an easily recognizable state, on the basis of the surrounding image; a computing step of computing at least one of a position and a posture of the part to be loaded and unloaded on the basis of the first information image; and a posture detection step of detecting the posture of the part to be loaded and unloaded on the basis of a computation result in the computing step. In the posture detection step, a second information image obtained by projecting information acquired at a position where the surrounding image has been acquired onto a horizontal plane including a feature line of the item is created, a boundary portion of a feature part estimated in advance in the item is disposed at any position of the second information image in the creation of the second information image, the second information image is scanned across a first region in which the feature part is present and a second region in which the feature part is not present to acquire a change in a visual parameter, notation information indicating the boundary portion of the item is calculated on the basis of the change in the visual parameter, the feature line is detected on the basis of the notation information, and the posture is detected on the basis of a difference in angle between the feature line and a reference line in the second information image.

[Aspect 8]

There is provided an industrial vehicle including the item detection device according to any one of Aspects 1 to 6.

REFERENCE SIGNS LIST

32: imaging unit, 50: forklift (industrial vehicle), 51: vehicle body, 61: pallet (item), 61*a*: front surface (part to be loaded and unloaded), 100: item detection device, 101: image acquisition unit, 103: information image creation unit, 104: computing unit, 109: posture detection unit, 110: control unit.

What is claimed is:

1. An item detection device that detects an item to be loaded and unloaded, the device comprising:

an image acquisition unit acquiring a surrounding image obtained by capturing surroundings of the item detection device;

an information image creation unit creating a first information image, in which information related to a part to be loaded and unloaded in the item has been converted into an easily recognizable state, on the basis of the surrounding image;

a computing unit computing at least one of a position and a posture of the part to be loaded and unloaded on the basis of the first information image; and a posture detection unit detecting the posture of the part to be loaded and unloaded on the basis of a computation result of the computing unit, wherein the information image creation unit creates a second information image obtained by projecting the information acquired at a position where the surrounding image has been acquired onto a horizontal plane including a feature line of the item, and the posture detection unit disposes a boundary portion of a feature part estimated in advance in the item at any position of the second information image in the second information image, scans the second information image across a first region in which the feature part is present and a second region in which the feature part is not present to acquire a change in a visual parameter, calculates notation information indicating the boundary portion of the item on the basis of the change in the visual parameter, detects the feature line on the basis of the notation information, and detects the posture on the basis of a difference in angle between the feature line and a reference line in the second information image.

2. The item detection device according to claim 1, wherein the visual parameter is a gray value in a case in which the second information image is expressed in monochrome.

3. The item detection device according to claim 1, wherein the notation information is a point group, and the posture detection unit applies RANSAC to the point group to detect the feature line.

4. The item detection device according to claim 1, wherein the item is a pallet, and the feature part is an end portion of the pallet estimated from a presence candidate for the pallet detected in the first information image.

5. The item detection device according to claim 1, wherein the item is a pallet, and the feature part is an end portion of a shadow of a hole portion of the pallet estimated from a presence candidate for the pallet detected in the first information image.

6. The item detection device according to claim 1, wherein the posture detection unit uses an average value of an acquisition result of the visual parameter in a first local region selected from the first region and an acquisition result of the visual parameter in a second local region selected from the second region as a threshold value for determining the change in the visual parameter.

7. An item detection method for detecting an item to be loaded and unloaded, the method comprising:

an image acquisition step of acquiring a surrounding image obtained by capturing surroundings;

an information image creation step of creating a first information image, in which information related to a part to be loaded and unloaded in the item has been converted into an easily recognizable state, on the basis of the surrounding image;

a computing step of computing at least one of a position and a posture of the part to be loaded and unloaded on the basis of the first information image; and a posture detection step of detecting the posture of the part to be loaded and unloaded on the basis of a computation result in the computing step, wherein, in the posture detection step, a second information image obtained by projecting information acquired at a position where the surrounding image has been acquired onto a horizontal plane including a feature line of the item is created, a boundary portion of a feature part estimated in advance in the item is disposed at any position of the second information image in the creation of the second information image, the second information image is scanned across a first region in which the feature part is present and a second region in which the feature part is not present to acquire a change in a visual parameter, notation information indicating the boundary portion of the item is calculated on the basis of the change in the visual parameter, the feature line is detected on the basis of the notation information, and the posture is detected on the basis of a difference in angle between the feature line and a reference line in the second information image.

8. An industrial vehicle comprising:

the item detection device according to claim 1.

9. An industrial vehicle comprising the item detection device according to claim 2.

10. An industrial vehicle comprising the item detection device according to claim 3.

11. An industrial vehicle comprising the item detection device according to claim 4.

12. An industrial vehicle comprising the item detection device according to claim 5.

13. An industrial vehicle comprising the item detection device according to claim 6.

* * * * *